United States Patent
Khoshnevisan et al.

(10) Patent No.: US 11,463,195 B2
(45) Date of Patent: Oct. 4, 2022

(54) HANDLING DOWNLINK ASSIGNMENT INDICATORS FOR DIFFERENT TYPES OF DOWNLINK CONTROL INFORMATION

(71) Applicant: QUALCOMM Incorporated, San Diego, CA (US)

(72) Inventors: Mostafa Khoshnevisan, San Diego, CA (US); Jing Sun, San Diego, CA (US); Kapil Bhattad, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 16/830,132

(22) Filed: Mar. 25, 2020

(65) Prior Publication Data
US 2020/0336239 A1  Oct. 22, 2020

(30) Foreign Application Priority Data
Apr. 19, 2019 (IN) .............................. 201941015678

(51) Int. Cl.
*H04L 1/00* (2006.01)
*H04L 1/18* (2006.01)
(Continued)

(52) U.S. Cl.
CPC ............ *H04L 1/003* (2013.01); *H04L 1/1812* (2013.01); *H04W 24/08* (2013.01); *H04W 72/042* (2013.01)

(58) Field of Classification Search
CPC ...... H04L 1/003; H04L 1/1812; H04W 24/08; H04W 72/042
See application file for complete search history.

(56) References Cited

U.S. PATENT DOCUMENTS 9,686,064 B2 * 6/2017 He .......................... H04L 1/1861
10,075,263 B2 * 9/2018 Kusashima ........... H04L 5/1469
(Continued)

FOREIGN PATENT DOCUMENTS

CN  108293253 A * 7/2018 ........... H04B 7/0417
CN  108353312 A * 7/2018 ............ H04W 28/04
(Continued)

OTHER PUBLICATIONS

International Search Report and Written Opinion—PCT/US2020/024999—ISA/EPO—dated Jul. 15, 2020.
(Continued)

*Primary Examiner* — Eric Nowlin
(74) *Attorney, Agent, or Firm* — Qualcomm Incorporated

(57) ABSTRACT

Methods, systems, and devices for wireless communications are described to enable a user equipment (UE) to identify one or more missed downlink control messages. The UE may use indicators received with downlink control messages to order the downlink control messages and determine if a message is missing. Indicators in different downlink control messages may be transmitted using different numbers of bits, and the UE may use methods to compare the indicators with different bit sizes. The UE may compare all the indicators using the smallest indicator bit size or may compare indicators in sequential pairs, using a shared bit size for indicators having a same bit size and using a smallest bit size for indicators having different bit sizes. After comparing indicators and determining if one or more messages are missing, the UE may notify the base station of any missing downlink control messages using a feedback message.

38 Claims, 12 Drawing Sheets

(51) Int. Cl.
*H04W 24/08* (2009.01)
*H04W 72/04* (2009.01)

(56) References Cited

U.S. PATENT DOCUMENTS

| | | | |
|---|---|---|---|
| 10,320,533 B2 * | 6/2019 | Kusashima | H04L 5/001 |
| 10,419,178 B2 * | 9/2019 | He | H04L 1/1861 |
| 10,536,960 B2 * | 1/2020 | Park | H04L 1/1685 |
| 10,574,405 B2 * | 2/2020 | Kusashima | H04W 72/04 |
| 10,588,117 B2 * | 3/2020 | Li | H04L 1/1825 |
| 10,841,066 B2 * | 11/2020 | Takeda | H04W 52/545 |
| 2016/0212734 A1 * | 7/2016 | He | H04L 1/1861 |
| 2017/0170931 A1 * | 6/2017 | Kusashima | H04L 5/001 |
| 2017/0310447 A1 * | 10/2017 | Kusashima | H04W 72/044 |
| 2018/0006791 A1 * | 1/2018 | Marinier | H04L 5/0055 |
| 2018/0034610 A1 * | 2/2018 | He | H04L 5/0048 |
| 2018/0167173 A1 * | 6/2018 | Guan | H04L 1/1854 |
| 2018/0175973 A1 * | 6/2018 | Rosa | H04L 5/0055 |
| 2018/0249458 A1 * | 8/2018 | He | H04L 1/1861 |
| 2018/0279266 A1 * | 9/2018 | Li | H04B 7/0456 |
| 2018/0323938 A1 * | 11/2018 | Takeda | H04L 1/1861 |
| 2018/0343088 A1 * | 11/2018 | Kusashima | H04L 5/001 |
| 2019/0230685 A1 * | 7/2019 | Park | H04L 1/1864 |
| 2019/0253206 A1 * | 8/2019 | Kusashima | H04W 72/04 |
| 2020/0036494 A1 * | 1/2020 | He | H04L 5/0055 |
| 2020/0259601 A1 * | 8/2020 | Zhou | H04L 5/0085 |
| 2020/0336239 A1 * | 10/2020 | Khoshnevisan | H04W 24/08 |
| 2021/0144688 A1 * | 5/2021 | Lin | H04L 1/1861 |
| 2021/0152292 A1 * | 5/2021 | Fu | H04W 52/48 |
| 2021/0167900 A1 * | 6/2021 | Karaki | H04W 72/0446 |
| 2021/0194646 A1 * | 6/2021 | Feh | H04W 72/1289 |
| 2021/0258998 A1 * | 8/2021 | Khoshnevisan | H04L 5/0044 |

FOREIGN PATENT DOCUMENTS

| | | | | |
|---|---|---|---|---|
| EP | 3354096 A1 * | 8/2018 | | H04B 7/0417 |
| EP | 3364582 A1 * | 8/2018 | | H04J 11/00 |
| EP | 3354096 A4 * | 5/2019 | | H04L 1/1861 |
| EP | 3503446 A1 * | 6/2019 | | H04L 1/1812 |
| EP | 3654562 A1 * | 5/2020 | | H04L 5/0055 |
| EP | 3676978 A1 * | 7/2020 | | H04W 72/1257 |
| EP | 3354096 B1 * | 8/2020 | | H04B 7/0456 |
| EP | 3676978 A4 * | 9/2020 | | H04W 52/325 |
| JP | W02017078033 A1 * | 9/2018 | | H04J 11/00 |
| JP | 6467066 B2 * | 2/2019 | | H04L 1/16 |
| JP | 6703083 B2 * | 6/2020 | | H04J 11/00 |
| JP | 7027430 B2 * | 3/2022 | | B41J 5/105 |
| JP | 2020506579 A * | 3/2022 | | |
| KR | 20190099366 A * | 8/2019 | | H04W 52/545 |
| KR | 20200040890 A * | 4/2020 | | H04W 52/58 |
| KR | 102150449 B1 * | 3/2022 | | |
| MX | 2018003617 A * | 4/2018 | | H04B 7/0417 |
| MX | 2018005526 A * | 8/2018 | | H04J 11/00 |
| WO | WO-2017050265 A1 * | 3/2017 | | H04B 7/0417 |
| WO | WO-2017078033 A1 * | 5/2017 | | H04L 5/0055 |
| WO | WO-2019050363 A1 * | 3/2019 | | H04L 1/1819 |
| WO | WO-2020214376 A1 * | 10/2020 | | H04W 24/08 |

OTHER PUBLICATIONS

Nokia Networks: "Dynamic HARQ-ACK Codebook Size Determination", 3GPP Draft, 3GPP TSG-RAN WG1 Meeting #82bis, R1-155581, 3rd Generation Partnership Project (3GPP), Mobile Competence Centre, 650, Route Des Lucioles, F-06921, Sophia-Antipolis Cedex, France, vol. RAN WG1, No. Malmo, Sweden, Oct. 5, 2015-Oct. 9, 2015, Oct. 4, 2015 (Oct. 4, 2015), XP051002445, 5 Pages, Retrieved from the Internet: URL: http://www.3gpp.org/ftp/Meetings_3GPP_SYNC/RAN1/Docs/, [retrieved on Oct. 4, 2015], p. 3.

* cited by examiner

HANDLING DOWNLINK ASSIGNMENT INDICATORS FOR DIFFERENT TYPES OF DOWNLINK CONTROL INFORMATION

CROSS REFERENCE

The present Application for Patent claims the benefit of Indian Patent Application No. 201941015678 by KHOSHNEVISAN et al., entitled "HANDLING DOWNLINK ASSIGNMENT INDICATORS FOR DIFFERENT TYPES OF DOWNLINK CONTROL INFORMATION," filed Apr. 19, 2019, assigned to the assignee hereof, and which is expressly incorporated by reference herein.

BACKGROUND

The following relates generally to wireless communications, and more specifically to handling downlink assignment indicators (DAIs) for different types of downlink control information (DCI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station may transmit multiple downlink control messages to a UE with information regarding multiple downlink data transmissions. In some cases, a UE may miss one or more downlink control messages or otherwise be unable to receive one or more downlink control messages and, as such, may not receive transmitted data in the one or more corresponding downlink data transmissions.

SUMMARY

A method for wireless communications is described. The method may include receiving a first downlink control information (DCI) message for a first downlink data transmission and a second DCI message for a second downlink data transmission, the first DCI message including a first number of bits for a first counter downlink assignment indicator (cDAI) and the second DCI message including a second number of bits for a second cDAI, determining whether the first number of bits for the first cDAI is different than the second number of bits for the second cDAI, and transmitting a feedback message for at least the first downlink data transmission and the second downlink data transmission, the feedback message based on the determining.

An apparatus for wireless communications is described. The apparatus may include a processor, memory in electronic communication with the processor, and instructions stored in the memory. The instructions may be executable by the processor to cause the apparatus to receive a first DCI message for a first downlink data transmission and a second DCI message for a second downlink data transmission, the first DCI message including a first number of bits for a first cDAI and the second DCI message including a second number of bits for a second cDAI, determine whether the first number of bits for the first cDAI is different than the second number of bits for the second cDAI, and transmit a feedback message for at least the first downlink data transmission and the second downlink data transmission, the feedback message based on the determining.

Another apparatus for wireless communications is described. The apparatus may include means for receiving a first DCI message for a first downlink data transmission and a second DCI message for a second downlink data transmission, the first DCI message including a first number of bits for a first cDAI and the second DCI message including a second number of bits for a second cDAI, determining whether the first number of bits for the first cDAI is different than the second number of bits for the second cDAI, and transmitting a feedback message for at least the first downlink data transmission and the second downlink data transmission, the feedback message based on the determining.

A non-transitory computer-readable medium storing code for wireless communications is described. The code may include instructions executable by a processor to receive a first DCI message for a first downlink data transmission and a second DCI message for a second downlink data transmission, the first DCI message including a first number of bits for a first cDAI and the second DCI message including a second number of bits for a second cDAI, determine whether the first number of bits for the first cDAI is different than the second number of bits for the second cDAI, and transmit a feedback message for at least the first downlink data transmission and the second downlink data transmission, the feedback message based on the determining.

DETAILED DESCRIPTION

Figure 1:
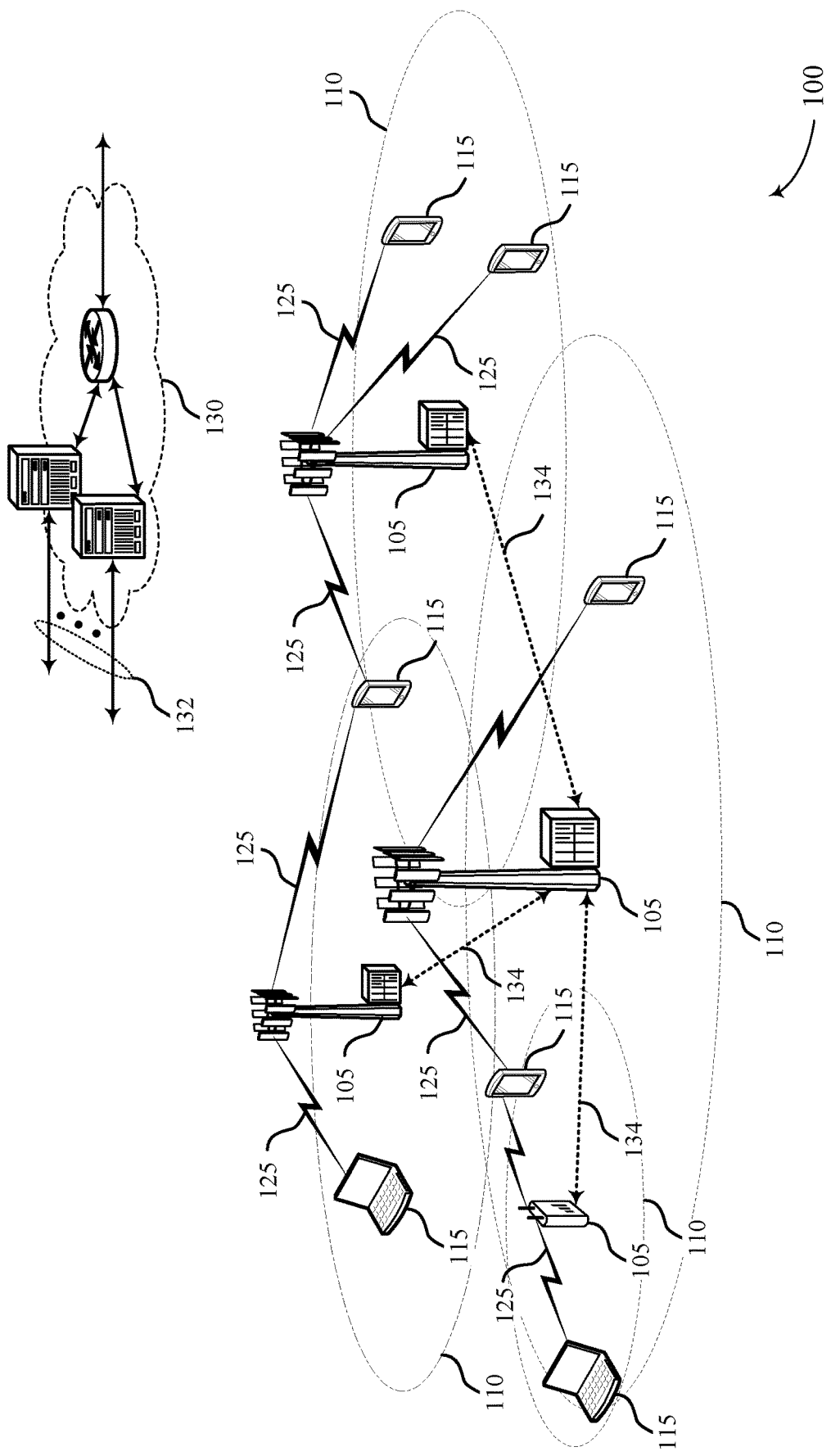
FIGS. 1 and 2 illustrate examples of wireless communications systems that support handling downlink assignment indicators (DAIs) for different types of downlink control information (DCI) in accordance with aspects of the present disclosure.

In some wireless communications systems, a base station may transmit multiple downlink control messages (e.g., downlink control information (DCI) messages) to a user equipment (UE) to schedule multiple corresponding downlink data messages. The base station may, for example, transmit the downlink control messages and the downlink data messages via one or more physical downlink control channels (PDCCHs) and one or more physical downlink shared channels (PDSCHs), respectively. In some cases, the UE may fail to decode one or more of the downlink control messages and may implement methods for detecting a missed downlink control message and notifying the base station of the missed downlink control message. For example, a downlink control message may include a counter downlink assignment indicator (cDAI) (e.g., a multi-bit field or some other indicator) to support identification of a missed downlink control message. The cDAI may represent a number, such as a cumulative number, associated with at least some, if not each, respective downlink control message corresponding to a same feedback opportunity. In some cases, the feedback opportunity may also be indicated in the downlink control message. A UE may use the cDAI to create a list of received cDAIs and to detect cDAI gaps in the list, for example, corresponding to one or more missed downlink control messages.

In some examples, the base station may transmit downlink messages to the UE over multiple component carriers (CCs) (e.g., as a part of carrier aggregation). The base station may include a total downlink assignment indicator (tDAI) (e.g., a multi-bit field or some other indicator) in at least some of the downlink control messages, where the tDAI may represent a total number of downlink control messages that are transmitted in a same monitoring period (e.g., a same PDCCH monitoring period) across the multiple CCs. Accordingly, the UE may identify one or more missed downlink control messages for a PDCCH monitoring period if the UE does not receive a number of downlink control messages over the PDCCH monitoring period equal to the number indicated by the tDAI. In some examples, the UE may use the cDAI field and the tDAI field to identify one or more missed downlink control messages. As described herein, a downlink assignment indicator (DAI) may represent a tDAI, a cDAI, or both, and a DAI field may represent a tDAI field, a cDAI field, or both.

The UE may transmit, to the base station, a message providing feedback for the one or more missed downlink data messages. The feedback message (e.g., a request message) may indicate the one or more missed downlink control messages identified by the UE (e.g., and may request the base station to retransmit the one or more downlink data messages). In some cases, the UE 115 may transmit a request by reporting a hybrid automatic repeat request (HARQ) negative acknowledgment (NACK) to the base station for at least some, if not each, missed downlink message. For example, the UE may transmit HARQ signaling (e.g., including the NACK) in the feedback opportunity scheduled for the multiple downlink data messages.

In some cases, the base station may transmit a DAI field (e.g., a cDAI or tDAI field, or both) using a specified number of bits (e.g., two bits, three bits, four bits, or any other number of bits), and the UE may employ an operation, such as a reverse modulo operation, to convert the value represented by the bits into a corresponding DAI value (e.g., because a limited number of values may be represented with an amount of bits available for the DAI field). In some cases, the base station may transmit the DAI field such that DAI fields in different downlink control messages may include different numbers of bits (e.g., two bits, three bits, four bits, or any other numbers of bits). For example, a number of bits for a DAI field may correspond to a type of communication, a channel, or a spectrum used for communications. In some cases, the UE may receive multiple DAI fields from the base station (e.g., transmitted via multiple DCIS), where the DAI fields may have different bit sizes for different downlink control messages. As such, if the UE were to perform the same reverse modulo operations on the DAI fields having different bit sizes, the modulo operations may give inaccurate or indefinite results. For example, the UE may fail to identify missed downlink control messages based on the different sizes of DAI fields. Accordingly, the UE may employ techniques for handling multiple DAIs (e.g., cDAIs or tDAIs, or both) with different DAI field sizes.

In a first example, a UE may analyze received (e.g., detected) downlink control messages to determine whether the downlink control messages are associated with a same feedback message (e.g., feedback opportunity) and whether the downlink control messages include DAI fields of the same size (e.g., bit size). If the received downlink control messages correspond to the same feedback message and include DAI fields (e.g., cDAI or tDAI fields, or both) of the same size, the UE may use a same reverse modulo operation to convert the values from the DAI bits into corresponding DAI values. For example, a reverse modulo operation may use a modulo size of 2', corresponding to a number of bits, n, in the DAI fields. If the DAI fields in the detected downlink control messages include different numbers of bits for different downlink control messages, the UE may perform a reverse modulo operation on the received DAIS using a minimum number of DAI bits associated with the DAI fields (e.g., corresponding to a DAI field having a smallest bit size). In some cases, performing a reverse modulo operation based on the minimum number of bits may include ignoring or disregarding one or more most significant bits of larger DAI fields. In some cases, such a reverse modulo operation may be implemented at the UE with negligible adjustments and/or delays. Based on converting the DAI fields to the DAI values, the UE may use the DAI values to detect one or more missed downlink control messages. If a missed downlink control message is detected, the UE may report a NACK to the base station in a feedback message (e.g., transmitted during a feedback opportunity) corresponding to the missed downlink control message.

In a second example, if the UE determines that the DAI fields in the detected downlink control messages include different numbers of bits (e.g., do not include a same number of bits), the UE may order detected cDAIs across CCs and then across PDCCH monitoring occasions. The UE may compare consecutive cDAIs to detect any missing values, for example, by comparing cDAIs with the same bit size without changing the bit size and by comparing cDAIs with different bit sizes using the smaller bit size, as described herein (e.g., by dropping one or more most significant bits). If any missing cDAIs are detected, the UE may perform a reverse modulo operation on the received DAIS using the minimum number of bits associated with the DAI fields. If the UE detects any missed downlink control messages, the UE may report a NACK to the base station in a feedback message corresponding to the missed downlink control messages. The feedback message may be an example of a HARQ transmission.

Aspects of the disclosure are initially described in the context of wireless communications systems. Aspects of the disclosure are further illustrated by and described with reference to a signaling schedule, a modulo operation, a process flow, apparatus diagrams, system diagrams, and flowcharts that relate to handling DAIS for different types of DCI.

FIG. 1 illustrates an example of a wireless communications system 100 that supports handling DAIs for different types of DCI in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may include 6 or 7 modulation symbol periods (e.g., depending on the length of the cyclic prefix prepended to each symbol period). Excluding the cyclic prefix, each symbol period may include 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots including one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be, for example, an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a codebook may be used for transmitting feedback from a UE 115 to a base station 105. The codebook may be based on PDCCH monitoring occasions (e.g., a PDCCH monitoring occasion spanning multiple CCs), which may in turn be based on a configuration of different search space sets in different serving cells. For example, a codebook may be determined based on a union of PDCCH monitoring occasions across active downlink bandwidth parts of configured serving cells, ordered in ascending order of start time of the search space set associated with a PDCCH monitoring occasion. DCI or other downlink control messages may be transmitted in PDCCH monitoring occasions and may, in some cases, correspond to a same codebook.

In some wireless communications systems 100, a base station 105 may transmit multiple downlink control messages (e.g., DCI messages) to a UE 115 (e.g., via a PDCCH) to schedule multiple corresponding downlink data messages (e.g., transmitted via a PDSCH). In some cases, the UE 115 may fail to decode one or more of the downlink control messages (e.g., due to interference, such as bursty interference, or blocking) and may implement methods for detecting the missed downlink control message(s) and for notifying the base station 105 of such. For example, a downlink control message may include a multi-bit field, cDAI, representing a cumulative number associated with each respective downlink control message corresponding to a same feedback opportunity, where the feedback opportunity may also be indicated in the downlink control message. A UE 115 may use the cDAI to create a list of received cDAIs and to detect cDAI gaps in the list, where the cDAI gaps may correspond to one or more missed downlink control messages.

In some examples, if the base station 105 transmits downlink messages to the UE 115 over multiple CCs (e.g., as a part of carrier aggregation), the downlink control messages may also include a multi-bit field, tDAI, representing a total number of downlink control messages corresponding to a same feedback opportunity. The tDAI value may be the same for each downlink control message received in a same PDCCH monitoring occasion (e.g., across multiple CCs). The UE 115 may thus identify one or more missed downlink control messages if the UE 115 does not receive an amount of downlink control messages indicated by the tDAI for a PDCCH monitoring occasion (e.g., and may use the cDAI field to identify a specific missed downlink control message).

In some cases, the base station 105 may transmit a DAI field (e.g., a cDAI or tDAI field, or both) using a specified number of bits (e.g., two bits, three bits, or four bits), and the UE 115 may employ a reverse modulo operation to convert the value represented by the bits into a corresponding DAI value (e.g., because a limited number of values may be represented with the number of bits available for the DAI field). In some cases, the base station 105 may transmit the DAI field using different numbers of bits (e.g., two bits, three bits, or four bits) in different DCI messages, where the number of bits may correspond to a type of communication, channel, configuration, or spectrum used for communications. In some cases, the UE 115 may receive multiple DAI fields from the base station 105 (e.g., transmitted via multiple DCIS), where the DAI fields may have different bit sizes for different downlink control messages. As such, if the UE performs the same reverse modulo operations on DAI fields having different bit sizes, the operations may result in inaccurate DAI values. In some cases, the UE 115 may fail to identify missed downlink control messages based on this field size discrepancy. Accordingly, the UE 115 may employ techniques for handling multiple DAIs (e.g., cDAIs or tDAIs, or both) with different DAI field sizes.

If the downlink control messages correspond to a same feedback message and include DAI fields of the same size, the UE 115 may use the same reverse modulo operation to convert the values from the DAI bits into the DAI values. If the DAI fields in the detected downlink control messages do not include the same number of bits, the UE 115 may convert the received DAIs using a reverse modulo operation based on a minimum number of bits associated with the DAI fields (e.g., based on a smallest DAI field). Based on the DAI fields being converted to DAI values (e.g., "absolute" DAI values), the UE 115 may use the DAI fields to detect one or more missed downlink control messages. Additionally or alternatively, the UE 115 may order detected cDAIs across CCs and then across PDCCH monitoring occasions. The UE 115 may compare consecutive cDAIs in the ordered list of cDAIs to detect any missing values, where the UE 115 may compare cDAIs with a same bit size without changing the bit size and may compare cDAIs with different bit sizes using the smaller bit size. If any missing cDAIs are detected, the UE 115 may convert the received cDAIs using a reverse modulo operation based on the minimum number of bits associated with the cDAI fields. In some cases, performing a reverse modulo operation based on the minimum number of bits may include ignoring one or more most significant bits of larger DAI fields (e.g., cDAI and/or tDAI fields) and may be implemented at the UE 115 with negligible adjustments and/or delays. If the UE detects one or more missing cDAI fields and corresponding missed downlink control messages, the UE 115 may report a NACK to the base station 105 in a feedback message (e.g., a HARQ message) corresponding to the missed downlink control message(s).

Figure 2:
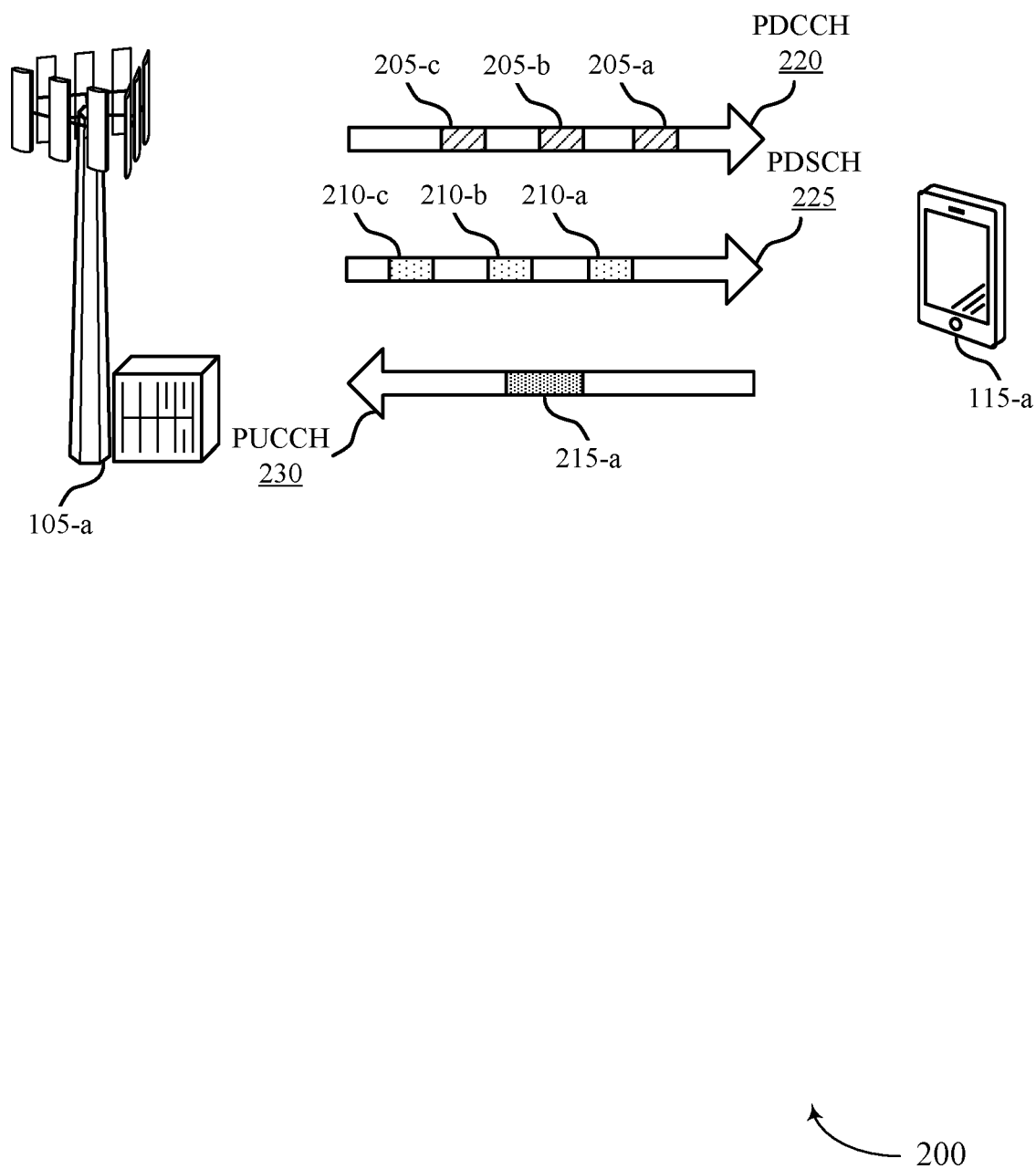

FIG. 2 illustrates an example of a wireless communications system 200 that supports handling DAIs for different types of DCI in accordance with aspects of the present disclosure. In some examples, wireless communications system 200 may implement aspects of wireless communications system 100 and may include a UE 115-*a* and a base station 105-*a*, which may be examples of a UE 115 and a base station 105 described with reference to FIG. 1. In some cases, base station 105-*a* may transmit one or more downlink control messages 205 and one or more corresponding downlink data messages 210 to UE 115-*a* and may configure UE 115-*a* to provide feedback (e.g., positive acknowledgment/negative acknowledgment (ACK/NACK) feedback, such as HARQ feedback) regarding the one or more downlink data messages 210.

For example, a base station 105 may transmit (e.g., via a PDCCH) multiple downlink control messages 205 (e.g., DCI messages) to a UE 115 to schedule multiple corresponding downlink data messages 210 (e.g., transmitted via a PDSCH). In some cases, the UE 115 may fail to decode one or more of the downlink control messages 205 and may implement methods for detecting a missed downlink control message 205 and notifying the base station 105 of the missed downlink control message 205. For example, each downlink control message 205 may include a multi-bit field indicating a cDAI that may be used to detect any missed downlink control message(s) 205. A UE 115 may use the cDAI to create a list of received cDAIs corresponding to a same feedback opportunity and to detect cDAI gaps in the list, where the cDAI gaps may correspond to one or more missed downlink control messages 205. If one or more missed downlink control messages 205 are detected, the UE 115 may report a NACK to the base station 105 in the feedback opportunity scheduled for the one or more downlink data messages, which may also be associated with the one or more missed downlink control messages.

In some examples, a downlink control message 205 may also include a multi-bit field indicating a tDAI for detecting any missed downlink control message(s). The UE 115 may identify one or more missed downlink control messages 205 if the UE 115 does not receive a number of downlink control messages equal to the number indicated by the tDAI for a specific PDCCH monitoring occasion. If one or more missed downlink control messages are detected, the UE 115 may transmit a feedback message for the one or more downlink data messages to the base station 105 (e.g., requesting to retransmit the one or more downlink data messages). In some cases, the UE 115 may transmit feedback by reporting a NACK to the base station 105 via ACK/NACK feedback.

In some cases, the base station 105 may transmit a DAI field (e.g., a cDAI or tDAI field, or both) using a specified number of bits (e.g., two bits, three bits, or four bits), and the UE 115 may employ a reverse modulo operation to convert the bit values into a corresponding DAI value (e.g., because a limited number of values may be represented with the specified number of bits). For example, if the base station 105 transmits the DAI fields using two bits each, the UE 115 may use a reverse modulo operation based on the number four (e.g., the number of different bit values that may be represented by the two bits) to convert the bit value into a DAI value. The UE 115 may store a counter (e.g., j) that the UE 115 may increment each time a bit value for a cDAI goes to zero, or each time a current bit value for a cDAI is less than a previous bit value for a cDAI corresponding to the same feedback opportunity.

the UE 115 may multiply the counter, j, by the modulo base number (e.g., four) and add the result to the value transmitted in the bits to produce a DAI value. In some cases, if the UE 115 were to miss a number of downlink control messages equal to or greater than the modulo base number (e.g., greater than or equal to four, when transmitting DAI using two bits), the UE 115 may not determine that the downlink control messages were missed because the UE 115 may not have incremented the counter to produce the correct DAI value. For example, the base station 105 may transmit downlink control messages including cDAI values of "00," "01," "10," "11," "00," and "01," and the UE 115 may receive the downlink control messages 205 including the first "00" value and the last "01" value, but not the intervening downlink control messages 205. As such, the UE 115 may fail to increment a counter for the reverse modulo operation and may treat the last "01" value as the value immediately following the first "00" value, for example, as if no cDAI values (and corresponding downlink control messages 205) were missed. Reverse modulo operations that may be performed by the UE 115 are further described herein with reference to FIG. 4.

In some cases, the base station 105 may transmit DAI fields in different downlink control messages 205 using different numbers of bits, where the number of bits may correspond to a type of communication, channel, or spectrum used for the downlink control message 205, among other examples. For example, the base station 105 may use a different (e.g., greater) number of bits for DAI fields when transmitting in conditions that have a higher likelihood to result in missed downlink control messages 205. In some cases, the greater number of bits may support identifying a greater number of missed downlink control messages 205 in sequence.

For example, a base station 105 may transmit a DAI field using a higher number of bits (e.g., three bits or four bits) if transmitting in a shared or unlicensed spectrum (e.g., due to a higher likelihood of interference and missed transmissions). In some cases, shared spectrum may include licensed spectrum, unlicensed spectrum, or a combination of licensed and unlicensed spectrum. Similarly, a base station 105 may transmit a DAI field using a lower number of bits (e.g., two bits) when using a licensed spectrum.

In some cases, the base station 105 may transmit fallback downlink control messages 205 with smaller-bit (e.g., two-bit) DAI fields, including when transmitting in a shared or unlicensed spectrum. In some examples, the bit size of the DAI fields may be configurable (e.g., dynamically configurable by the base station 105) and may be different for different CCs, control resource sets (CORESETs), or search spaces, among other examples. Different numbers of bits in the DAI fields may correspond to different modulo base numbers or schemes used to construct DAI values. For example, a two-bit field may correspond to a modulo-four operation to construct a DAI value, while a three-bit field may correspond to a modulo-eight operation. In some cases, two-bit DAI fields may support identifying up to three downlink control messages 205 missed in a row, while three-bit DAI fields may support identifying up to seven downlink control messages 205 missed in a row.

If a UE 115 receives downlink control messages 205 (e.g., DCIs) with a relatively higher number of DAI bits (e.g., three bits or four bits), and if the received downlink control messages 205 corresponding to a same feedback opportunity have the same DAI bit size (e.g., cDAI or tDAI bit size, or both), the UE 115 may use the same reverse modulo operation (e.g., corresponding to the higher number of DAI bits) to convert the DAI field values into the DAI values. In some cases, the UE 115 may receive multiple DAI fields from the base station 105 (e.g., transmitted via multiple downlink control messages 205), where the DAI fields may have different bit sizes for different downlink control messages 205. For example, downlink control messages 205 corresponding to one CC may use a first number of bits for a cDAI and downlink control messages 205 corresponding to a second CC may use a second number of bits different from the first number of bits for a cDAI. As such, if the UE 115 were to perform the same reverse modulo operations on the DAI fields having different bit sizes, the resulting DAI values may be inaccurate. In some cases, the UE 115 may fail to identify missed downlink control messages based on the different DAI sizes (e.g., and the inaccurate DAI values). Additionally or alternatively, the UE 115 may not have (e.g., may not be configured with) a codebook for generating a feedback message based on different sizes of DAI fields. Accordingly, the UE 115 may employ techniques described herein for handling multiple DAIS with different DAI field sizes.

For example, base station 105-a may transmit downlink control messages 205-a, 205-b, and 205-c (e.g., DCI messages) to UE 115-a (e.g., via a PDCCH 220), where the downlink control messages 205-a, 205-b, and 205-c may correspond to a same feedback opportunity. Each downlink control message 205 may include information regarding a corresponding respective downlink data message 210 to be transmitted from base station 105-a to UE 115-a (e.g., via a PDSCH 225). For example, downlink control message 205-a may include scheduling information relating to downlink data message 210-a, downlink control message 205-b may include scheduling information relating to downlink data message 210-b, and so on.

Downlink control messages 205 may also include one or more DAI fields (e.g., cDAI fields and/or tDAI fields, where tDAI fields may be included if base station 105-a uses different CCs to communicate with UE 115-a). In some cases, the DAI fields may include different numbers of bits for different downlink control messages 205. UE 115-a may monitor PDCCH 220 to receive downlink control messages 205, and in some cases may not receive one or more downlink control messages 205 (e.g., downlink control message 205-b) due to conditions of the PDCCH 220 (e.g., due to interference) or due to conditions at UE 115-a (e.g., due to conflicts created by processing speed or other messaging). UE 115-a may process the DAI fields in the received downlink control messages 205 (e.g., downlink control messages 205-a and 205-c) and use the DAI fields to determine whether a downlink control message 205 was missed.

In one example, UE 115-a may process the received (e.g., detected) downlink control messages 205-a and 205-c to determine whether they are associated with a same feedback message 215-a (e.g., in a single feedback opportunity) and whether they include DAI fields of the same size (e.g., bit size). If the downlink control messages 205 correspond to the same feedback message 215-a and include DAI fields of the same size, UE 115-a may use the same reverse modulo operation to convert the values from the DAI bits into the DAI values (e.g., where the reverse modulo operation may correspond to the number of bits in the DAI fields). For example, if the DAI fields include two bits, UE 115-a may use a reverse modulo-four operation to compute the correct DAI value, and if the DAI fields include four bits, UE 115-a may use a reverse modulo-16 operation. If the DAI fields in detected downlink control messages 205-a and 205-c do not include the same number of bits, UE 115-a may convert the received DAIS (e.g., cDAIs, tDAIs, or both) using a reverse modulo operation based on a minimum number of bits associated with the DAI fields. For example, the minimum number of bits may be based on a smallest DAI field of the downlink control messages 205.

In some cases, performing a reverse modulo operation based on the minimum number of bits may be accomplished by ignoring one or more most significant bits of larger DAI fields. Once the DAI fields are converted to the DAI values, UE 115-a may use the DAI values as described herein to detect one or more missed downlink control messages 205 (e.g., downlink control message 205-b). If detected, UE 115-a may report a NACK to the base station in a feedback message 215-a scheduled for the corresponding downlink data message(s) 210. The NACK may correspond to the one or more missed downlink control messages 205.

In a first example, UE 115-a may receive a cDAI field value of "101" in downlink control message 205-a and may receive a cDAI field value of "11" in downlink control message 205-c. UE 115-a may therefore determine that the minimum DAI size is two bits and may ignore extra bits (e.g., beyond two least significant bits) in the cDAI corresponding to downlink control message 205-a. UE 115-a may compare a resulting value of "01" from downlink control message 205-a with a value of "11" from downlink control message 205-c and may determine that cDAI value corresponding to "10" is missing. Based on the missing cDAI value, UE 115-a may determine that downlink control message 205-b (e.g., corresponding to the cDAI value "10") is missed and may report a NACK to base station 105-a for downlink data message 210-b in feedback message 215-a (e.g., transmitted via a physical uplink control channel (PUCCH) 230). UE 115-a may attempt to decode downlink data messages 210-a and 210-c according to the information received in downlink control messages 205-a and 205-c. UE 115-a may report corresponding ACK/NACK feedback for downlink data messages 210-a and 210-c (e.g., based on decoding success or failure for the downlink data messages 210-a and 210-c) via feedback message 215-a (e.g., transmitted via PUCCH 230). For example, UE 115-a may input the ACK/NACK feedback for downlink data message 210-a, the NACK for missed downlink control message 205-b, and the ACK/NACK feedback for downlink data message 210-c into a codebook (e.g., a HARQ-ACK codebook) and transmit a resulting codeword as feedback to base station 105-a.

In a second example, UE 115-a may analyze the received (e.g., detected) downlink control messages 205-a and 205-c to determine whether they are associated with the same feedback message 215-a and whether they include DAI fields of the same size (e.g., bit size). If the received downlink control messages 205 correspond to the same feedback message 215-a and include DAI fields (e.g., cDAI or tDAI fields, or both) of the same size, UE 115-a may use the same reverse modulo operation to convert the values from the DAI bits into the DAI values (e.g., where the reverse modulo operation may be based on the number of bits in the DAI fields). If the DAI fields in detected downlink control messages 205-a and 205-c do not include the same number of bits, UE 115-a may determine an order for the detected downlink control messages 205 and, correspondingly, for the cDAIs.

For example, UE 115-a may order any detected cDAIs across CCs and then across PDCCH monitoring occasions. UE 115-a may compare consecutive cDAIs (e.g., consecutive according to the ordered list of cDAIs) to detect any missing values, where UE 115-a may compare cDAIs with the same bit size without changing the bit size and may compare cDAIs with different bit sizes using the smaller bit size, as described herein (e.g., without considering one or more most significant bits). UE 115-a may insert placeholders into the ordered list for any identified missed cDAIs. In some cases, UE 115-a may convert all the cDAIs (e.g., the received cDAIs and the placeholder cDAIs) using a reverse modulo operation based on a minimum number of bits associated with the cDAI fields. In some cases, performing a reverse modulo operation based on the minimum number of bits may include ignoring one or more most significant bits of the larger cDAI fields, as described herein. In some examples, UE 115-a may use the determined cDAI values as described herein to detect any missed downlink control messages 205. UE 115-a may report a NACK to the base station in feedback message 215-a for any identified missed downlink control messages 205 (e.g., missed downlink control message 205-b).

In a third example, if the DAI fields in detected downlink control messages 205-a and 205-c do not include the same number of bits (and if downlink control messages 205-a, 205-b, and 205-c are transmitted in a same PDCCH monitoring occasion), UE 115-a may replace the tDAI in each downlink control message 205 with the largest tDAI bit size and value or the smallest tDAI bit size and value for that monitoring occasion. For example, UE 115-*a* may replace the tDAIs for downlink control messages 205 received on different CCs of a same monitoring occasion with the tDAI with the largest bit size and may use this tDAI value to detect any missed downlink control messages 205 in that monitoring occasion. Once the tDAI fields are converted, UE 115-*a* may use the tDAI fields to detect missed downlink control message 205-*b*. For example, UE 115-*a* may determine that a tDAI value is three for the three downlink control messages 205, but that UE 115-*a* received two downlink control messages 205 in the monitoring occasion. If detected, UE 115-*a* may report a NACK to the base station in feedback message 215-*a* corresponding to the missed downlink control message 205-*b* and associated downlink data message 210-*b*.

Additionally, UE 115-*a* may verify whether one or more least significant bits of the tDAI values are the same for all received downlink control messages 205 in the same PDCCH monitoring occasion. If this verification process fails, the UE 115-*a* may determine that at least one downlink control message 205 was received incorrectly for that PDCCH monitoring occasion, for example, because the tDAIs for downlink control messages 205 in the same monitoring occasion should correspond to a same tDAI value.

In some examples, UE 115-*a* may receive downlink control messages 205-*a* and 205-*c* in the same PDCCH opportunity and on different CCs. Downlink control messages 205-*a* and 205-*c* may include a tDAI field, where downlink control message 205-*a* may include a tDAI value of "10" and downlink control message 205-*c* may include a tDAI value of "110". Accordingly, UE 115-*a* may compare the received tDAI values and may replace the tDAI in each downlink control message 205 with the largest tDAI bit size and value (e.g., "110"). UE 115-*a* may use the largest tDAI value to detect missed downlink control message 205-*b*. For example, "10" may indicate that three DCI messages were transmitted in the monitoring occasion (e.g., depending on a counter value), while "110" may indicate that seven DCI messages were transmitted in the monitoring occasion (e.g., depending on the counter value). Additionally, UE 115-*a* may verify the validity of the largest tDAI value by checking one or more least significant bits (e.g., up to the minimum number of bits) of both tDAI values and ensuring that they are the same (e.g., both are "10").

In some cases, UE 115-*a* may perform the tDAI check prior to performing the cDAI check. If UE 115-*a* determines that it received the correct number of downlink control messages 205 in a given monitoring occasion based on the tDAI check, UE 115-*a* may conserve resources by refraining from performing a cDAI check for these downlink control messages 205. In some other cases, UE 115-*a* may perform the cDAI check prior to the tDAI check, or UE 115-*a* may perform the checks concurrently (e.g., in at least one overlapping time resource).

Figure 3:
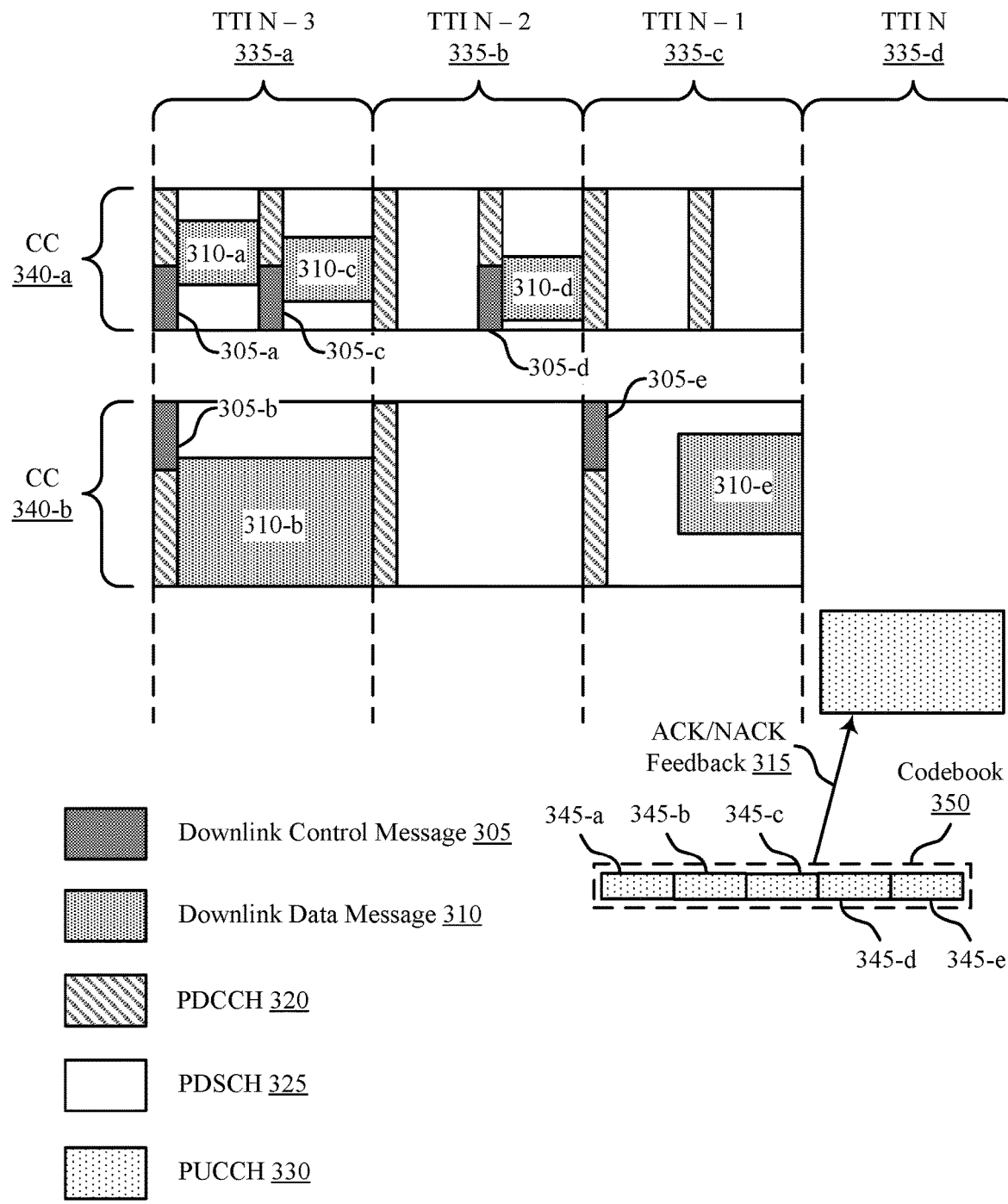
FIG. 3 illustrates an example of a signaling schedule that supports handling DAIs for different types of DCI in accordance with aspects of the present disclosure.

FIG. 3 illustrates an example of a signaling schedule 300 that supports handling DAIs for different types of DCI in accordance with aspects of the present disclosure. In some examples, signaling schedule 300 may implement aspects of wireless communications systems 100 or 200 and may be implemented by a base station 105 and a UE 115, which may be examples of a base station 105 and a UE 115 described with reference to FIGS. 1 and 2. In some cases, the base station 105 may implement signaling schedule 300 to transmit one or more downlink control messages 305 and one or more corresponding downlink data messages 310 to the UE 115 and may configure the UE 115 to provide feedback (e.g., ACK/NACK feedback 315) regarding the one or more downlink data messages 310.

In one example, the base station 105 may transmit five downlink control messages 305 (e.g., downlink control messages 305-*a*, 305-*b*, 305-*c*, 305-*d*, and 305-*e*) and five corresponding downlink data messages 310 (e.g., downlink data messages 310-*a*, 310-*b*, 310-*c*, 310-*d*, and 310-*e*) to the UE 115. In some cases, the base station 105 may transmit the downlink control messages 305 via one or more PDCCHs 320 and may transmit the downlink data messages 310 via one or more PDSCHs 325. For example, the base station 105 may transmit downlink control messages 305-*a*, 305-*c* and 305-*d* and corresponding downlink data messages 310-*a*, 310-*c*, and 310-*d* via a first CC 340-*a* (e.g., "CC 0") and may transmit downlink control messages 305-*b* and 305-*e* and corresponding downlink data messages 310-*b* and 310-*e* via a second CC 340-*b* (e.g., "CC 1"). In some examples, CC 0 may represent a CC 340 with two PDCCH monitoring occasions per TTI 335, and CC 1 may represent a CC 340 with one PDCCH monitoring occasion per TTI 335. In some cases, the base station 105 may also transmit different downlink control messages 305 within different TTIs 335 (e.g., within one or more of TTIs 335-*a*, 335-*b*, and 335-*c*).

In some examples, the base station 105 may configure the UE 115 (e.g., via a K1 field in each downlink control message 305) to use a same opportunity for ACK/NACK feedback 315 for each of the downlink data messages 310, where the ACK/NACK feedback 315 may be transmitted within a TTI 335-*d*. For example, a K1 value indicated in downlink control messages 305-*a*, 305-*b*, and 305-*c* (e.g., all within TTI 335-*a*, which may correspond to a TTI N−3) may have a value of three, indicating the ACK/NACK feedback is scheduled three TTIs after TTI 335-*a* (e.g., scheduled in TTI N, which is three TTIs 335 after TTI N−3). Similarly, a K1 value indicated in downlink control message 305-*d* (e.g., within TTI 335-*b*, which may correspond to a TTI N−2) may have a value of two and a K1 value indicated in downlink control message 305-*e* (e.g., within TTI 335-*c*, which may correspond to a TTI N−1) may have a value of one. In some cases, the UE 115 may determine a feedback value 345 (e.g., indicating a positive acknowledgment (ACK) or a NACK) for each downlink data message 310 based on reception of the downlink data message 310 or the corresponding downlink control message 305.

For example, feedback value 345-*a* may be based on reception of downlink data message 310-*a* or downlink control message 305-*a*, feedback value 345-*b* may be based on reception of downlink data message 310-*b* or downlink control message 305-*b*, and so on. Upon determining a feedback value 345 for each downlink data message 310, the UE 115 may input the feedback values 345 into a codebook 350 to determine ACK/NACK feedback 315 for transmission to the base station 105. The UE 115 may transmit the ACK/NACK feedback 315 to the base station 105 via the PUCCH 330. The base station 105 may monitor for the ACK/NACK feedback 315 according to an expected format for the ACK/NACK feedback 315, where the format may be based on the codebook 350. As such, the base station 105 may fail to receive the ACK/NACK feedback 315 if the UE 115 did not use the correct codebook 350 (e.g., the correct number of inputs to the codebook 350). Accordingly, if the UE 115 fails to determine that it missed one or more downlink control messages 305 and the corresponding downlink data messages 310, the UE 115 may use an incorrect codebook 350 and transmit feedback that may fail to be received by the base station 105.

To support identification of missed downlink information at a UE 115, the base station 105 may include a cDAI field in each of the downlink control messages 305. In some cases, the base station 105 may also include a tDAI field in downlink control messages 305 to indicate a counter value for messages sharing a same PDCCH opportunity (e.g., downlink control messages 305-*a* and 305-*b*). For example, downlink control message 305-*a* may include a cDAI field indicating a cDAI value of one and may include a tDAI field indicating a tDAI value of two. Downlink control message 305-*b* may include a cDAI field indicating a cDAI value of two and may include a tDAI field indicating a tDAI value of two (e.g., indicating that downlink control message 305-*a* and downlink control message 305-*b* are transmitted in the same monitoring occasion). Downlink control messages 305-*c*, 305-*d*, and 305-*e* may include cDAI fields indicating cDAI values of three, four, and five respectively.

In some examples, the UE 115 may not receive some downlink control messages 305 due to channel conditions or conditions at the UE 115 and may implement methods for detecting and reporting missed downlink control messages 305. For example, the UE 115 may not receive downlink control messages 305-*b* and 305-*d* and may identify the missed downlink control messages 305 using received DAI values (e.g., cDAI or tDAI values, or both). For example, if the UE 115 has received a tDAI field in downlink control message 305-*a* indicating a value of two but has not received a cDAI field of two (e.g., because downlink control message 305-*b* is missed), the UE 115 may determine that downlink control message 305-*b* is missed. Accordingly, the UE 115 may input a NACK in the corresponding feedback value 345-*b*.

In some examples, the UE 115 may list the received cDAI values (e.g., one, three, five) and may thus determine that cDAI values of two and four are not received in the corresponding downlink control messages 305-*b* and 305-*d* (e.g., because downlink control messages 305-*b* and 305-*d* are missed). Therefore, the UE 115 may determine that downlink control messages 305-*b* and 305-*d* are missed and may input a NACK in the corresponding feedback values 345-*b* and 345-*d*, respectively. The UE 115 may fill remaining feedback values 345-*a*, 345-*c*, and 345-*e* based on reception and decoding of downlink data messages 310-*a*, 310-*c*, and 310-*e*, respectively, and may determine the ACK/NACK feedback 315 based on the codebook 350 (e.g., and the input feedback values 345). The UE 115 may transmit the ACK/NACK feedback 315 to the base station 105 (e.g., via the PUCCH 330 or another feedback channel). The base station 105 may retransmit, to the UE 115, any downlink control messages 305 and downlink data messages 310 corresponding to any NACKs received in the ACK/NACK feedback 315.

As described herein with reference to FIGS. 1 and 2, the UE 115 may receive DAI fields (e.g., cDAI or tDAI fields, or both) within one or more downlink control messages 305, where the DAI fields in different downlink control messages 305 may include different numbers of bits. If the UE 115 were to perform the same reverse modulo operations on DAI fields having different bit sizes, the operations may give inaccurate or indefinite results, and the UE 115 may fail to identify missed downlink control messages 305. Accordingly, the UE 115 may employ techniques described herein for handling DAIS with different DAI field sizes.

For example, the base station 105 may transmit eight downlink control messages 305 (some not shown) with respective cDAI fields of "00," "001," "010," "011," "100," "101," "110," and "11" (e.g., corresponding to respective cDAI values 0, 1, 2, 3, 4, 5, 6, and 7). In some cases, the UE 115 may receive downlink control messages 305 including cDAI fields "00," "001," "110," and "11" (e.g., in that order) and may fail to receive other downlink control messages 305. Accordingly, the UE 115 may compare the cDAI field sizes to determine whether all cDAI fields are the same size or different sizes, and the UE 115 may determine that cDAI fields of different sizes were received. The UE 115 may order the cDAI values according to the reception of the downlink control messages 305 (e.g., ordered first across CCs 340 and then across PDCCH monitoring occasions) and may compare at least some, if not every, two consecutive cDAI fields using the received cDAI bit sizes or the smallest cDAI bit size per pair to detect missing cDAI fields (e.g., and corresponding missing downlink control messages 305).

For example, between "00" and "001," the UE 115 may compare according to the smaller number of bits (i.e., two bits) by ignoring or removing most significant bits from the cDAI with the larger number of bits until reaching the smaller number of bits (e.g., ignoring the most significant "0" to evaluate "00" and "01"). The UE 115 may determine that no downlink control messages 305 were missed between "00" and "01," as these values are contiguous (e.g., corresponding to 0 and 1). The UE 115 may also evaluate between bit values "001" and "110" and may detect four missing cDAI bit values, and the UE 115 may therefore fill the missing cDAI bit values in the corresponding places (e.g., fill in "010," "011," "100," and "101" values between "001" and "110" as placeholders). The UE 115 may additionally determine that no downlink control messages 305 were missed between "110" and "11" (e.g., using methods similar to those described with respect to values "00" and "001"). The UE 115 may perform a reverse modulo operation on the cDAI bit values, using the smallest cDAI size from the cDAI bit values, to create a list of cDAI values including the missed cDAI values (e.g., 0, 1, 2, 3, 4, 5, 6, and 7), and may report NACKs for any detected missing cDAI values (e.g., in a feedback value 345 corresponding to the missed downlink control message 305 and downlink data message 310). For example, the UE 115 may indicate NACKs to the base station 105 for the missed downlink control messages 305 including or associated with cDAIs "010," "011," "100," and "101."

In another example, the base station 105 may transmit seven downlink control messages 305 (e.g., DCIs) within a same PDCCH opportunity (e.g., on different CCs 340). In some examples, respective cDAI fields of the downlink control messages 305 may include values of "00," "001," "10," "011," "100," "101," and "110" (e.g., corresponding to cDAI values 0, 1, 2, 3, 4, 5, and 6) and respective tDAI fields of the downlink control messages 305 may include values of "10," "110," "10," "110," "110," "110," and "110," (e.g., corresponding to tDAI values of 6). In some cases, the UE 115 may receive the first three downlink control messages 305 and not the other downlink control messages 305. The UE 115 may compare the tDAI field sizes and bit values to determine the largest tDAI value from the tDAI field of the largest size. The UE 115 may determine, for example, from the second received downlink control message 305 (e.g., the downlink control message 305 with the largest size tDAI field), that the largest tDAI value is "110" and may replace the tDAI fields in the other received downlink control messages 305 with a value of "110". The UE 115 may verify that least significant bits of the received tDAI fields are the same (e.g., "10") and may thus determine that the tDAI replacement method is valid. Further, the UE 115 may determine that the last four downlink control messages 305 are missed because cDAI fields from "011" to "110" (e.g., "110" being the indicated tDAI) were not detected within received downlink control messages 305. The UE 115 may report NACKs for any detected missing cDAI values (e.g., in a feedback message to the base station 105, such as an ACK/NACK feedback 315).

Figure 4:
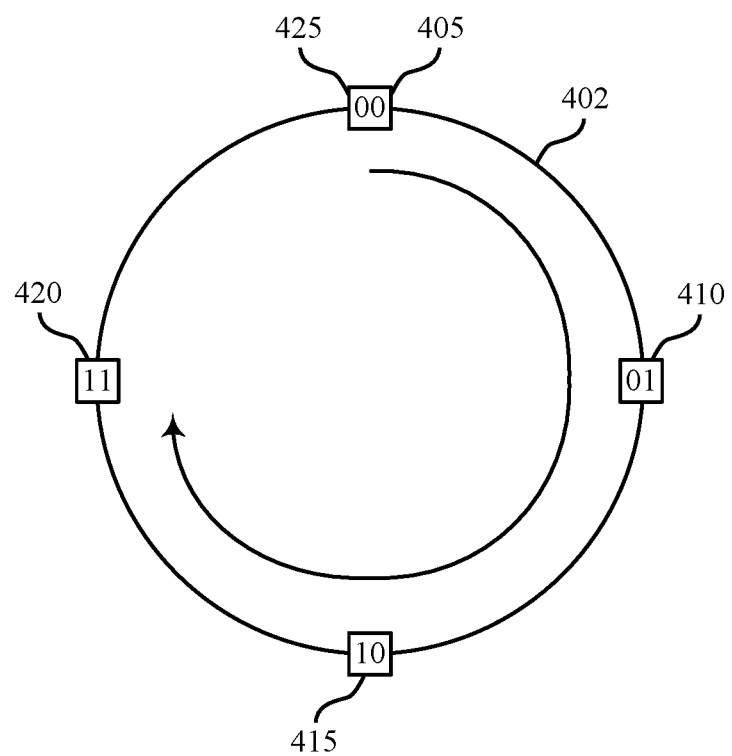
FIG. 4 illustrates an example of a modulo operation that supports handling DAIs for different types of DCI in accordance with aspects of the present disclosure.

FIG. 4 illustrates an example of a modulo operation 400 that supports handling DAIs for different types of DCI in accordance with aspects of the present disclosure. In some examples, modulo operation 400 may implement aspects of wireless communications systems 100 or 200 and may be implemented by a base station 105, which may be an example of a base station 105 described with reference to FIGS. 1-3. In some examples, a UE 115, which may be an example of a UE 115 described with reference to FIGS. 1-3, may implement a reverse modulo operation to undo the modulo operation 400. In some cases, the UE 115 may receive one or more downlink control messages including respective DAI fields (e.g., cDAI and/or tDAI fields), and the UE 115 may use the reverse modulo operation to convert the bit values in the DAI fields into accurate DAI values.

A reverse modulo operation may undo a modulo operation 400. For example, a modulo operation 400 may determine a remainder resulting from Euclidean division of a dividend by a divisor. For example, a base station 105 may use the modulo operation 400 to determine a bit value for a DAI field (e.g., the remainder) based on the DAI value (e.g., the dividend) and the number of bits in the DAI field (e.g., where the divisor equals $2^n$ for an n-bit field). In contrast, a reverse modulo operation may determine the dividend based on the remainder and the divisor. For example, a UE 115 may use the reverse modulo operation to determine the DAI value (e.g., the dividend) based on the bit value received in the DAI field (e.g., the remainder) and the number of bits in the DAI field (e.g., where the divisor equals $2^n$ for an n-bit field). In some cases, the reverse modulo operation may involve tracking a counter value (e.g., incremented each time a bit value returns to zero), multiplying the counter value by a multiplier (e.g., where the multiplier may be based on a bit size of the field), and adding a received bit value to the product of the counter and the multiplier.

In some wireless communications systems, a base station 105 may use a modulo—four circle 402 to determine bits to transmit in a two-bit DAI field (e.g., a cDAI or tDAI field, or both). Additionally or alternatively, the base station 105 may use different modulo numbers for different DAI field sizes (e.g., using a modulo $2^n$ circle for an n-bit DAI field). For example, for a first downlink control message (e.g., DCI) corresponding to a feedback opportunity (e.g., a HARQ process), the base station 105 may use bit value "00" at 405 to indicate a cDAI value of 0. The subsequent downlink control messages corresponding to the same feedback opportunity may use bit values "01" at 410 to indicate a cDAI value of 1, "10" at 415 to indicate a cDAI value of 2, and "11" at 420 to indicate a cDAI value of 3. A next DCI for the same feedback opportunity may use bit value "00" again at 425 for the cDAI field, because the base station 105 has traversed the modulo-four circle 402. However, based on the modulo operation, a UE 115 receiving the "00" and keeping track of a counter may determine that the first cDAI field indicating "00" corresponds to a cDAI value of 0 and the second cDAI field indicating "00" corresponds to a cDAI value of 4. In this way, the base station 105 may indicate any number of downlink control messages corresponding to a same HARQ process using a limited number of bits (e.g., as illustrated, two bits).

A UE 115 may receive downlink control messages from the base station 105 and may determine the DAI values indicated by the DAI fields. In one example, both cDAI and tDAI fields may include two bits and may respectively be represented by the field names $V_{C-DAI,c,m}^{DL}$ and $V_{T-DAI,c,m}^{DL}$ which may be interpreted by the UE 115 as using a modulo-four operation (e.g., corresponding to two bits). In some examples, the UE 115 may employ a parameter (e.g., variable) j to keep track of or determine cDAI and tDAI values (e.g., because two bits may be used to transmit cDAI and/or tDAI fields). In some cases, this process may refer to using the parameter j to indicate how many rounds the cDAI and/or tDAI have traversed the modulo-four circle 402. In some examples, the UE 115 may use the parameter j to compute the cDAI value using an equation:

$$cDAI = j \times 4 + V_{C-DAI,c,m}^{DL}, \qquad (1)$$

where cDAI is the cDAI value, j is the parameter used to keep track of the cDAI value, and $V_{C-DAI,c,m}^{DL}$ is the received cDAI field value (e.g., bit value). Similarly, in some examples, the UE 115 may use the parameter j to compute the tDAI value using an equation:

$$tDAI = j \times 4 + + V_{T-DAI,c,m}^{DL}, \qquad (2)$$

where tDAI is the tDAI value, j is the parameter used to keep track of the tDAI value, and $V_{T-DAI,c,m}^{DL}$ is the received tDAI field value (e.g., bit value). When interpreting $V_{C-DAI,c,m}^{DL}$ and $V_{T-DAI,c,m}^{DL}$ fields, different multipliers (e.g., the multiplier of 4 in equations 1 and 2) may be used for different field sizes (e.g., a $2^n$ multiplier for an n-bit DAI field). If a base station 105 uses a two-bit DAI field size in a DCI message, the UE 115 may use a multiplier of 4 (e.g., $2^2$) in the reverse modulo operation. Similarly, if the DAI field size is three bits, the UE 115 may use a multiplier of 8 (e.g., $2^3$). Both cDAI and tDAI fields may use the same j value to keep track of the actual cDAI and/or tDAI values (e.g., if the cDAI and tDAI bit fields in a DCI use the same number of bits).

In some cases, the UE 115 may increment the parameter j for each serving cell and PDCCH monitoring occasion pair if the current $V_{C-DAI,c,m}^{DL}$ (e.g., most recently received cDAI bit value) is smaller than the previous $V_{C-DAI,c,m}^{DL}$ (e.g., next most recently received cDAI bit value). This incrementation may correspond, for example, to a point at which the base station 105 traverses the modulo-four circle 402 and switches from "11" back to "00" for the next cDAI. The UE 115 may also compare a $V_{C-DAI,c,m}^{DL}$ with a $V_{T-DAI,c,m}^{DL}$ where both may be indicated in a most recent downlink control message (e.g., DCI), and may increment the parameter j an additional time if $V_{T-DAI,c,m}^{DL}$ is less than $V_{C-DAI,c,m}^{DL}$. In some cases, the UE 115 may use the constructed cDAI and/or tDAI values (e.g., constructed using equations 1 and 2 based on the reverse modulo operation) to determine any missing values corresponding to missed DCIs, for example, as described herein with reference to FIGS. 2 and 3. The UE 115 may place NACKs in feedback values corresponding to any missed DCIs (e.g., the UE 115 may construct a HARQ-ACK codebook) and may transmit the feedback values (e.g., and other feedback values) to the base station 105 in a feedback message, such as via a codebook or HARQ message.

In one example, the UE 115 may begin the reverse modulo operation with a value of zero for the parameter j. At 405, the UE 115 may receive a $V_{C-DAI,c,m}^{DL}$ bit value of "00" within a downlink control message and may determine (e.g., using equation 1) that this bit value represents a cDAI value of 0. Similarly, at 410, the UE 115 may receive a $V_{C-DAI,c,m}^{DL}$ bit value of "01" within a downlink control message and may determine (e.g., using equation 1) that this bit value represents a cDAI value of 1. The UE 115 may continue the reverse modulo operation at 415 and 420 by receiving, respectively, $V_{C-DAI,c,m}^{DL}$ bit values (e.g., cDAI bit values) of "10" and "11," corresponding to cDAI values of 2 and 3 (e.g., converted using equation 1).

At 425, the UE 115 may receive a $V_{C-DAI,c,m}^{DL}$ bit value of "00" for a second time (e.g., in another downlink control message), may determine that the modulo-four circle 402 has been traversed one time, and may increment the parameter j to a value of one. In some cases, the UE 115 may determine to increment j by comparing the current $V_{C-DAI,c,m}^{DL}$ bit value of "00" with the previous $V_{C-DAI,c,m}^{DL}$ bit value of "11," and determining that the current $V_{C-DAI,c,m}^{DL}$ bit value is less than the previous $V_{C-DAI,c,m}^{DL}$ bit value. In some cases, the UE 115 may determine to increment j by comparing the current $V_{C-DAI,c,m}^{DL}$ bit value with a current $V_{T-DAI,c,m}^{DL}$ bit value and finding that $V_{C-DAI,c,m}^{DL}$ is less than $V_{C-DAI,c,m}^{DL}$. In some examples, the UE 115 may use the incremented parameter j to determine a cDAI value corresponding the $V_{C-DAI,c,m}^{DL}$ received at 425 (e.g., using equation 1), where the cDAI value may be found to be 4.

This process of receiving $V_{C-DAI,c,m}^{DL}$ bit values and incrementing the parameter j may continue until the UE 115 determines that a downlink control message including a $V_{C-DAI,c,m}^{DL}$ bit value no longer corresponds to a same feedback opportunity as other (e.g., previously received) downlink control messages. If the UE 115 determines that that a downlink control message including a $V_{C-DAI,c,m}^{DL}$ bit value no longer corresponds to the same feedback opportunity, the UE 115 may determine, for example, to reset the parameter j to a value of zero.

Figure 5:
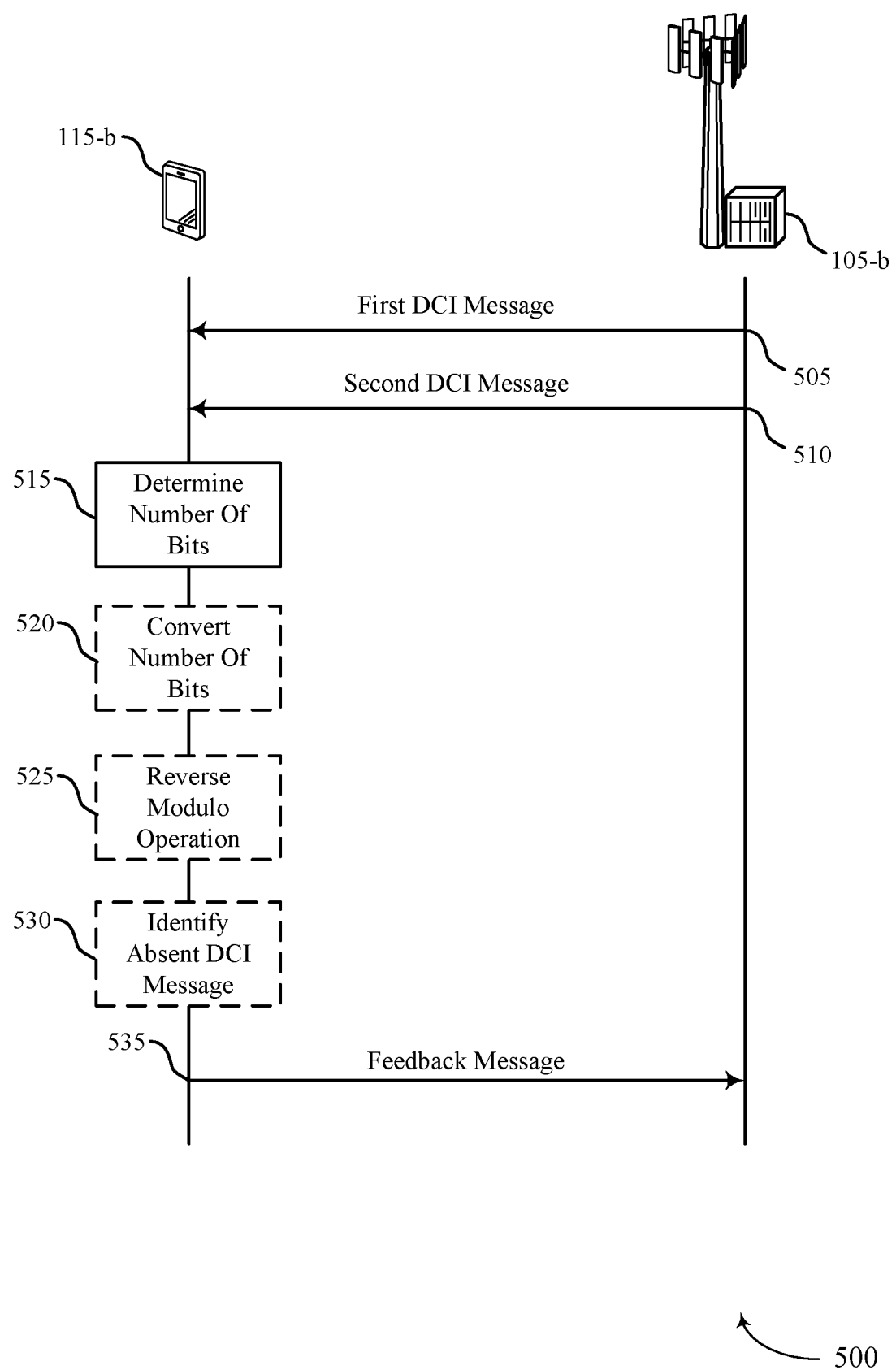
FIG. 5 illustrates an example of a process flow that supports handling DAIs for different types of DCI in accordance with aspects of the present disclosure.

FIG. 5 illustrates an example of a process flow 500 that supports handling DAIs for different types of DCI in accordance with aspects of the present disclosure. In some examples, process flow 500 may implement aspects of wireless communications systems 100 or 200 and may include a UE 115-b and a base station 105-b, which may be examples of a UE 115 and base station 105 described with reference to FIGS. 1-4. Process flow 500 may also implement aspects of signaling schedule 300 and/or modulo operation 400. In some cases, base station 105-b may transmit one or more downlink control messages and one or more corresponding downlink data messages to UE 115-b and may configure UE 115-b to provide feedback (e.g., ACK/NACK feedback) regarding the one or more downlink data messages. Further, in some examples, base station 105-b may transmit DAI fields (e.g., cDAI or tDAI fields, or both) within the one or more downlink control messages, where the DAI fields in different downlink control messages may include different numbers of bits (e.g., may have different sizes). As such, if UE 115-b were to perform the same reverse modulo operation on DAI fields having different bit sizes, the operation may give inaccurate or indefinite results, and UE 115-b may fail to identify one or more missed downlink control messages. Accordingly, UE 115-b may employ techniques for handling DAIs with different DAI field sizes.

In the following description of the process flow 500, the communications between UE 115-b and base station 105-b may be transmitted in a different order than the order shown, or the operations performed by base station 105-b and UE 115-b may be performed in different orders or at different times. Some operations may also be left out of the process flow 500, or other operations may be added to the process flow 500. It is to be understood that while base station 105-b and UE 115-b are shown performing a number of the operations of process flow 500, any wireless device may perform the operations shown.

At 505, base station 105-b may transmit, to UE 115-b, a first DCI message (e.g., downlink control message) for a first downlink data transmission (e.g., downlink data message), the first DCI message including a first number of bits for a first cDAI and a third number of bits for a first tDAI.

At 510, base station 105-b may transmit, to UE 115-b, a second DCI message (e.g., downlink control message) for a second downlink data transmission (e.g., downlink data message), the second DCI message including a second number of bits for a second cDAI and a fourth number of bits for a second tDAI.

In some cases, the first DCI message may be received before, concurrent with, or after the second DCI message is received. In some cases, the first DCI message and the second DCI message may correspond to different DCI types, different CCs, different monitoring occasions, different search space sets, different CORESETs, different dynamic configurations (e.g., where the DAI sizes are configurable by base station 105-b), or a combination thereof.

At 515, UE 115-b may determine whether the first number of bits for the first cDAI is different from the second number of bits for the second cDAI. In some cases, UE 115-b may determine that the first number of bits is less than the second number of bits. In some cases, UE 115-b may determine that the first number of bits is a minimum number of bits for a set of cDAIs of a set of DCI messages for downlink data transmissions, including at least the first downlink data transmission and the second downlink data transmission.

In some cases, UE 115-b may determine whether the third number of bits for the first tDAI is different from the fourth number of bits for the second tDAI. For example, UE 115-b may determine that the third number of bits is less than the fourth number of bits. In some cases, determining whether the third number of bits is different from the fourth number of bits may include determining that the fourth number of bits is a maximum number of bits for a set of tDAIs of a set of DCI messages received in a same monitoring occasion for the downlink data transmissions.

Additionally or alternatively, determining whether the third number of bits is different from the fourth number of bits may include determining that the third number of bits is a minimum number of bits for a set of tDAIs of a set of DCI messages received in a same monitoring occasion for the downlink data transmissions. In some examples, determining whether the third number of bits is different from the fourth number of bits may be performed before, concurrent with, or after determining whether the first number of bits is different from the second number of bits. Further, in some cases, the first number of bits may be equal to the third number of bits and the second number of bits may be equal to the fourth number of bits (e.g., a DCI may use a same number of bits for both the cDAI and the tDAI).

In some examples, UE 115-b may determine that the first number of bits is equal to the second number of bits, and in some cases, may determine that each DCI message for the set of downlink data transmissions includes a number of bits for a cDAI equal to the first number of bits and the second number of bits. In some cases, the first number of bits, the second number of bits, or both may be equal to three or more bits.

At 520, in some cases, UE 115-b may convert the second cDAI from the second number of bits to the first number of bits. Additionally or alternatively, UE 115-b may convert the first tDAI to the second tDAI and from the third number of bits to the fourth number of bits. In some examples, UE 115-*b* may convert the set of cDAIs to the first number of bits based on the first number of bits being the minimum number of bits for the set of cDAIs. For example, UE 115-*b* may remove a number of most significant bits from the second cDAI corresponding to a difference between the second number of bits and the first number of bits. In some examples, UE 115-*b* may convert the first tDAI to the second tDAI and from the third number of bits to the fourth number of bits. In some examples, UE 115-*b* may convert the set of tDAIs to the second tDAI and to the fourth number of bits based on the fourth number of bits being the maximum number of bits for the set of tDAIs.

Additionally, UE 115-*b* may verify that one or more least significant bits of the third number of bits and the fourth number of bits are the same. In other examples (e.g., when converting all values to the smallest number of bits), UE 115-*b* may convert the second tDAI to the first tDAI and from the fourth number of bits to the third number of bits. UE 115-*b*. In some cases, UE 115-*b* may further convert the set of tDAIs to the first tDAI and to the third number of bits based on the third number of bits being the minimum number of bits for the set of tDAIs.

In some cases, converting the second cDAI from the second number of bits to the first number of bits may include converting the set of cDAIs and the placeholder cDAIs of an ordered list to the first number of bits based on the first number of bits being a minimum number of bits for the set of cDAIs.

At 525, in some cases, UE 115-*b* may perform a reverse modulo operation for the first cDAI and the second cDAI using a same modulo size equal to the first number of bits, based on the first number of bits being less than the second number of bits. In some examples, UE 115-*b* may perform the reverse modulo operation for the set of cDAIs using the same modulo size equal to the first number of bits based on the first number of bits being the minimum number of bits for the set of cDAIs (e.g., corresponding to the same HARQ process).

In some examples, UE 115-*b* may perform a reverse modulo operation for the first cDAI and the second cDAI using a same modulo size equal to the first number of bits and the second number of bits (e.g., if the cDAIs are the same size). For example, UE 115-*b* may perform the reverse modulo operation for a set of cDAIs of a set of DCI messages for the downlink data transmissions using the same modulo size equal to the first number of bits and the second number of bits based on each DCI message including the number of bits for the cDAI equal to the first number of bits and the second number of bits (i.e., the same number of bits). In some cases, UE 115-*b* may perform the reverse modulo operation for the set of cDAIs and the placeholder cDAIs of the ordered list using the same modulo size equal to the first number of bits based on the first number of bits being the minimum number of bits for the set of cDAIs.

At 530, UE 115-*b* may identify whether a third DCI message is absent between the first DCI message and the second DCI message. In some cases, this identifying may be based on performing the reverse modulo operation. In some cases, UE 115-*b* may compare a number of DCI messages for a feedback message received in a same monitoring occasion to the second tDAI and may identify whether a third DCI message is absent from the same monitoring occasion based on the comparing.

In some cases, UE 115-*b* may identify that one or more DCI messages are absent between DCI messages of a consecutive pair of DCI messages based on a minimum number of bits for a cDAI of the consecutive pair of DCI messages (e.g., prior to converting the number of bits at 520). In some examples, UE 115-*b* may further insert placeholder cDAIs into an ordered list of cDAIs for each of the identified one or more DCI messages that are absent, where the ordered list may include a set of cDAIs of the set of DCI messages, ordered based on the ordered set of DCI messages.

At 535, UE 115-*b* may transmit the feedback message for at least the first downlink data transmission and the second downlink data transmission, the feedback message based on determining whether the first number of bits for the first cDAI is different from the second number of bits for the second cDAI. In some cases, the feedback message may be based on determining whether the third number of bits is different from the fourth number of bits, and in some cases, may be based on verifying that one or more least significant bits of the third number of bits and the fourth number of bits are the same. In some cases, UE 115-*b* may generate the feedback message based on identifying whether the third DCI message is absent. In some cases, the feedback message may correspond to the set of downlink data transmissions and UE 115-*b* may order a set of DCI messages for the set of downlink data transmissions. In some examples, UE 115-*b* may order the set of DCI messages by CCs, by monitoring occasions (e.g., PDCCH monitoring occasions), or by a combination thereof. In some examples, UE 115-*b* may determine whether cDAIs include different numbers of bits for each consecutive pair of DCI messages based on the ordering.

In some cases, the feedback message may include a HARQ ACK message (e.g., a HARQ message), and in some cases, UE 115-*b* may identify that the third DCI message is absent and may input a NACK indicator for the third DCI message into a codebook, where the feedback message may be generated based on the codebook.

Figure 6:
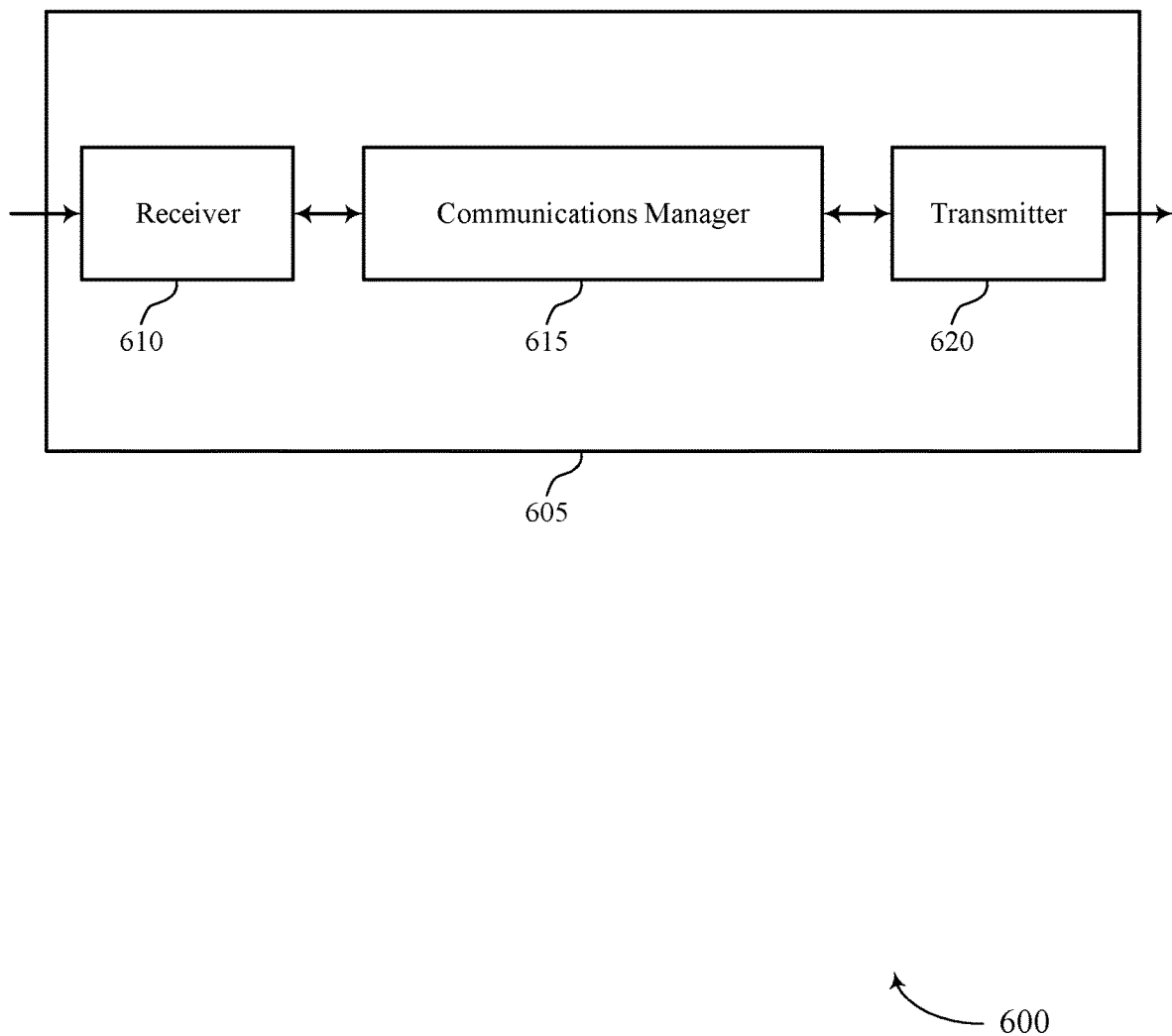
FIGS. 6 and 7 show block diagrams of devices that support handling DAIs for different types of DCI in accordance with aspects of the present disclosure.

FIG. 6 shows a block diagram 600 of a device 605 that supports handling DAIs for different types of DCI in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to handling DAIs for different types of DCI). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a first DCI message for a first downlink data transmission and a second DCI message for a second downlink data transmission, the first DCI message including a first number of bits for a first cDAI and the second DCI message including a second number of bits for a second cDAI, determine whether the first number of bits for the first cDAI is different from the second number of bits for the second cDAI, and transmit a feedback message for at least the first downlink data transmission and the second downlink data transmission, the feedback message based on the determining. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615 as described herein may be implemented to realize one or more potential advantages. For example, communications manager 615 may increase communication reliability and throughput and decrease power consumption at a UE by enabling the UE to identify missed downlink control messages and corresponding downlink data messages. Such identification may reduce retransmission latency of downlink data messages to the UE based on the UE identifying and requesting retransmission of one or more missed downlink control messages compared to other systems and techniques, for example, that do not support handling DAIs for different types of DCI. Communications manager 615 may save power and increase battery life at a UE by strategically reducing a number of retransmissions monitored by the UE.

Figure 7:
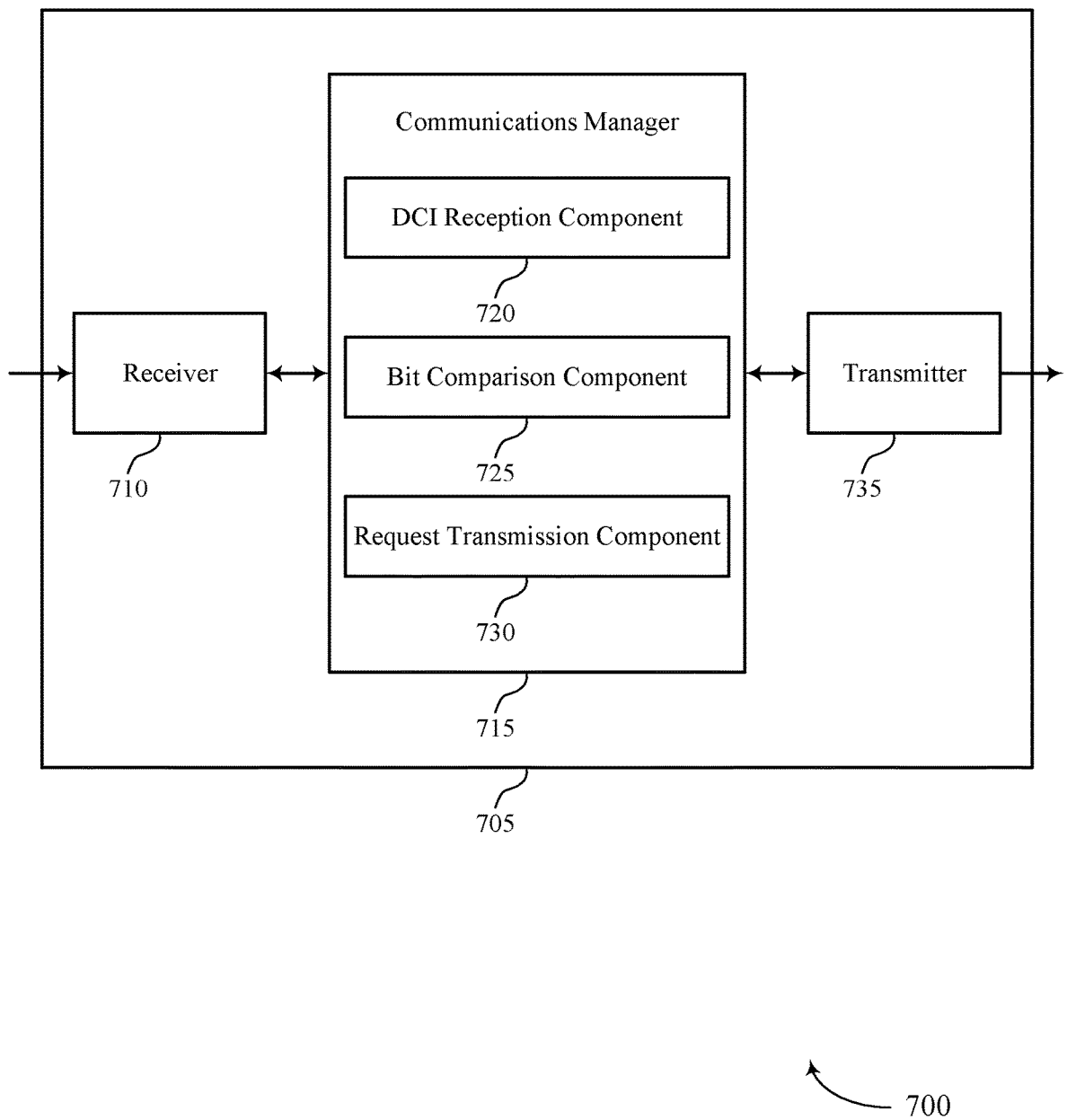

FIG. 7 shows a block diagram 700 of a device 705 that supports handling DAIs for different types of DCI in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to handling DAIs for different types of DCI). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a DCI reception component 720, a bit comparison component 725, and a request transmission component 730. The communications manager 715 may be an example of aspects of the communications manager 910 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an I/O component, a transceiver, a network server, another computing device, one or more other components described in the present disclosure, or a combination thereof in accordance with various aspects of the present disclosure.

The DCI reception component 720 may receive a first DCI message for a first downlink data transmission and a second DCI message for a second downlink data transmission, the first DCI message including a first number of bits for a first cDAI and the second DCI message including a second number of bits for a second cDAI.

The bit comparison component 725 may determine whether the first number of bits for the first cDAI is different from the second number of bits for the second cDAI.

The request transmission component 730 may transmit a feedback message for at least the first downlink data transmission and the second downlink data transmission, the feedback message based on the determining.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

A processor of a wireless device (e.g., controlling the receiver 710, the transmitter 735, or the transceiver 920 as described with reference to FIG. 9) may increase communication reliability and throughput and decrease power consumption at a UE by enabling the UE to identify missed downlink control messages and corresponding downlink data messages. Such identification may reduce retransmission latency to the UE (e.g., via implementation of system components described with reference to FIG. 8) based on identifying and requesting retransmission of one or more missed downlink control messages compared to other systems and techniques, for example, that do not support handling DAIs for different types of DCI. Further, the processor of the UE 115 may identify one or more aspects of a DAI field, a DAI value, or modulo operation, among other examples, to perform the processes described herein. The processor of the wireless device may use the DAI field, DAI value, or modulo operation to perform one or more actions that may result in higher communication reliability, as well as save power and increase battery life at the wireless device (e.g., by strategically reducing an amount of retransmissions for which the wireless device monitors a channel), among other benefits.

Figure 8:
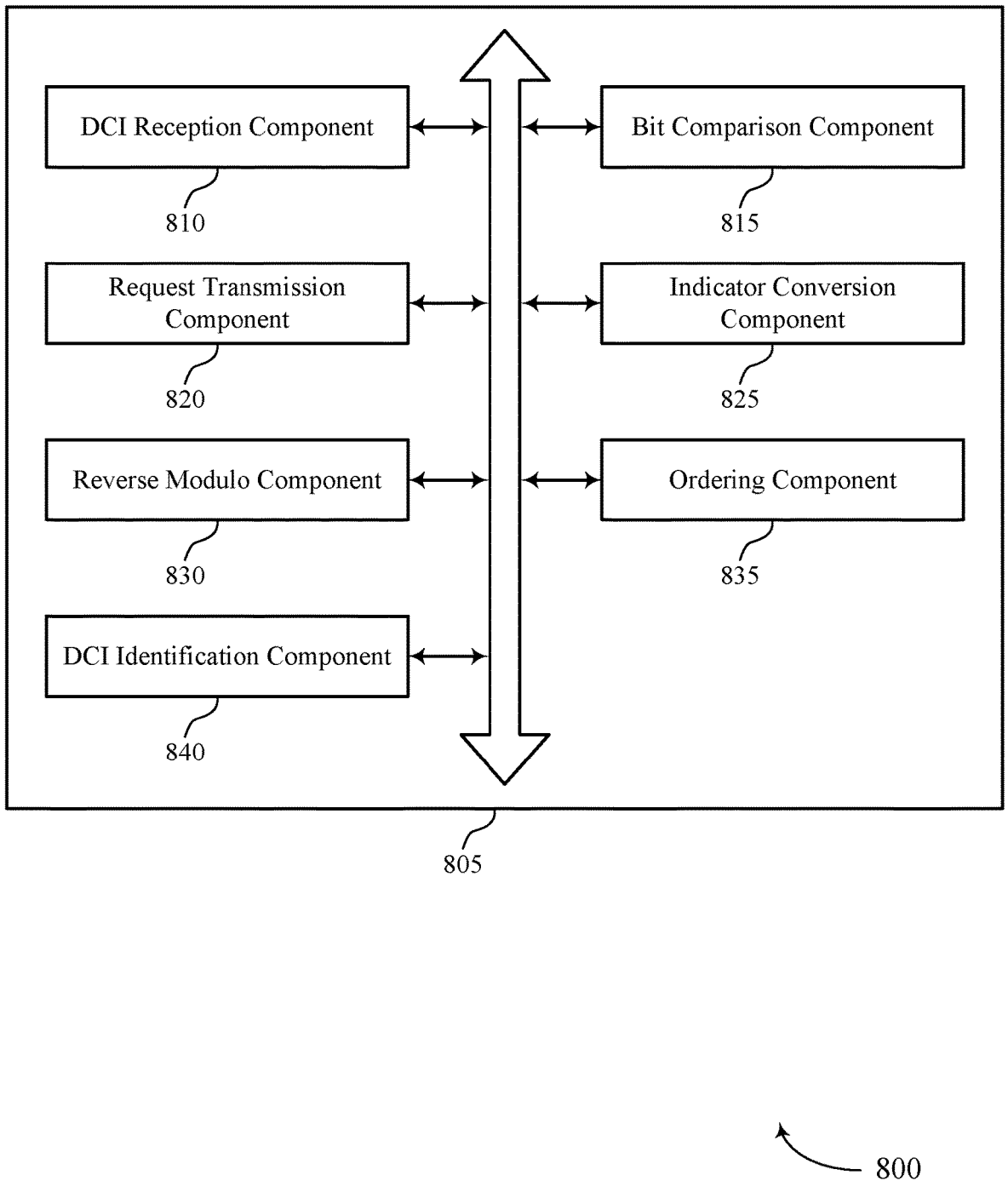
FIG. 8 shows a block diagram of a communications manager that supports handling DAIs for different types of DCI in accordance with aspects of the present disclosure.

FIG. 8 shows a block diagram 800 of a communications manager 805 that supports handling DAIs for different types of DCI in accordance with aspects of the present disclosure. The communications manager 805 may be an example of aspects of a communications manager 615, a communications manager 715, or a communications manager 910 described herein. The communications manager 805 may include a DCI reception component 810, a bit comparison component 815, a request transmission component 820, an indicator conversion component 825, a reverse modulo component 830, an ordering component 835, and a DCI identification component 840. Each of these modules may communicate, directly or indirectly, with one another (e.g., via one or more buses).

The communications manager 805, or its sub-components, may be implemented in hardware, code (e.g., software or firmware) executed by a processor, or any combination thereof. If implemented in code executed by a processor, the functions of the communications manager 805, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 805, or its sub-components, may be physically located at various positions, including being distributed such that portions of functions are implemented at different physical locations by one or more physical components. In some examples, the communications manager 805, or its sub-components, may be a separate and distinct component in accordance with various aspects of the present disclosure. In some examples, the communications manager 805, or its sub-components, may be combined with one or more other hardware components, including but not limited to an I/O component, a transceiver, a network server, another computing device, one or more other components described in the present disclosure, or a combination thereof in accordance with various aspects of the present disclosure.

The DCI reception component 810 may receive a first DCI message for a first downlink data transmission and a second DCI message for a second downlink data transmission, the first DCI message including a first number of bits for a first cDAI and the second DCI message including a second number of bits for a second cDAI. In some cases, the first DCI message is received before, concurrent with, or after the second DCI message is received. In some cases, the first DCI message and the second DCI message correspond to different DCI types, different CCs, different monitoring occasions, different search space sets, different CORESETs, different dynamic configurations, or a combination thereof. In some cases, the first number of bits, the second number of bits, or both are equal to three or more bits.

The bit comparison component 815 may determine whether the first number of bits for the first cDAI is different from the second number of bits for the second cDAI. In some examples, the bit comparison component 815 may determine that the first number of bits is a minimum number of bits for a set of cDAIs of a set of DCI messages for the set of downlink data transmissions. In some examples, the bit comparison component 815 may determine whether cDAIs include different numbers of bits for each consecutive pair of DCI messages based on the ordering. In some examples, determining whether the first number of bits for the first cDAI is different from the second number of bits for the second cDAI may include determining that each DCI message for the set of downlink data transmissions includes a number of bits for a cDAI equal to the first number of bits and the second number of bits. In some examples, the bit comparison component 815 may determine whether a third number of bits for a first tDAI is different from a fourth number of bits for a second tDAI, where the feedback message is based on the determining whether the third number of bits is different from the fourth number of bits. In some cases, the first number of bits is equal to the third number of bits. In some cases, the second number of bits is equal to the fourth number of bits.

In some examples, the bit comparison component 815 may verify that one or more least significant bits of the third number of bits and the fourth number of bits are the same, where the feedback message is based on the verifying. In some cases, the determining whether the third number of bits is different from the fourth number of bits includes determining that the fourth number of bits is a maximum number of bits for a set of tDAIs of a set of DCI messages received in a same monitoring occasion for the set of downlink data transmissions. In some cases, the determining whether the third number of bits is different from the fourth number of bits includes determining that the third number of bits is a minimum number of bits for a set of tDAIs of a set of DCI messages received in a same monitoring occasion for the set of downlink data transmissions. In some cases, the determining whether the third number of bits is different from the fourth number of bits is performed before, concurrent with, or after determining whether the first number of bits is different from the second number of bits.

The request transmission component 820 may transmit a feedback message for at least the first downlink data transmission and the second downlink data transmission, where the feedback message may be based on determining whether the first number of bits for the first cDAI is different from the second number of bits for the second cDAI. In some examples, the request transmission component 820 may generate the feedback message based on identifying whether a third DCI message is absent between the first DCI message and the second DCI message. In some examples, the request transmission component 820 may input a NACK indicator for the third DCI message into a codebook, where the feedback message is generated based on the codebook. In some cases, the feedback message is for a set of downlink data transmissions including at least the first downlink data transmission and the second downlink data transmission. In some cases, the feedback message includes a HARQ ACK message.

The indicator conversion component 825 may convert the second cDAI from the second number of bits to the first number of bits. In some examples, the indicator conversion component 825 may remove a number of most significant bits from the second cDAI corresponding to a difference between the second number of bits and the first number of bits. In some examples, the indicator conversion component 825 may convert the first tDAI to the second tDAI and from the third number of bits to the fourth number of bits. In some examples, the indicator conversion component 825 may convert the second tDAI to the first tDAI and from the fourth number of bits to the third number of bits. In some cases, converting the second cDAI from the second number of bits to the first number of bits includes converting the set of cDAIs to the first number of bits based on the first number of bits being the minimum number of bits for the set of cDAIs. In some cases, converting the second cDAI from the second number of bits to the first number of bits includes converting the set of cDAIs and the placeholder cDAIs of the ordered list to the first number of bits based on the first number of bits being a minimum number of bits for the set of cDAIs. In some cases, converting the first tDAI to the second tDAI and from the third number of bits to the fourth number of bits includes converting the set of tDAIs to the second tDAI and to the fourth number of bits based on the fourth number of bits being the maximum number of bits for the set of tDAIs. In some cases, converting the first tDAI to the second tDAI and from the third number of bits to the fourth number of bits includes converting the set of tDAIs to the first tDAI and to the third number of bits based on the third number of bits being the minimum number of bits for the set of tDAIs.

The reverse modulo component 830 may perform a reverse modulo operation for the first cDAI and the second cDAI using a same modulo size equal to the first number of bits based on the first number of bits being less than the second number of bits. In some examples, the reverse modulo component 830 may perform a reverse modulo operation for the first cDAI and the second cDAI using a same modulo size equal to the first number of bits and the second number of bits. In some examples, the reverse modulo component 830 may perform the reverse modulo operation for a set of cDAIs of a set of DCI messages for the set of downlink data transmissions using the same modulo size equal to the first number of bits and the second number of bits based on each DCI message including the number of bits for the cDAI equal to the first number of bits and the second number of bits. In some cases, the performing the reverse modulo operation includes performing the reverse modulo operation for the set of cDAIs using the same modulo size equal to the first number of bits based on the first number of bits being the minimum number of bits for the set of cDAIs. In some cases, the performing the reverse modulo operation includes performing the reverse modulo operation for the set of cDAIs and the placeholder cDAIs of the ordered list using the same modulo size equal to the first number of bits based on the first number of bits being the minimum number of bits for the set of cDAIs.

The ordering component 835 may order a set of DCI messages for the set of downlink data transmissions, where determining whether the first number of bits for the first cDAI is different from the second number of bits for the second cDAI is based on the first DCI message and the second DCI message being consecutive based on the ordering. In some examples, the ordering component 835 may ordered the set of DCI messages by CCs, by monitoring occasions, or by a combination thereof.

The DCI identification component 840 may identify that one or more DCI messages are absent between DCI messages of a consecutive pair of DCI messages based on a minimum number of bits for a cDAI of the consecutive pair of DCI messages. In some examples, the DCI identification component 840 may insert placeholder cDAIs into an ordered list of cDAIs for each of the identified one or more downlink control messages that are absent, where the ordered list includes a set of cDAIs of the set of DCI messages ordered based on the ordered set of DCI messages.

In some examples, the DCI identification component 840 may identify whether a third DCI message is absent between the first DCI message and the second DCI message based on performing the reverse modulo operation. In some examples, the DCI identification component 840 may compare a number of DCI messages for the feedback message received in a same monitoring occasion to the second tDAI. In some examples, the DCI identification component 840 may identify whether a third DCI message is absent from the same monitoring occasion based on comparing a number of DCI messages for the feedback message received in a same monitoring occasion to the second tDAI.

Figure 9:
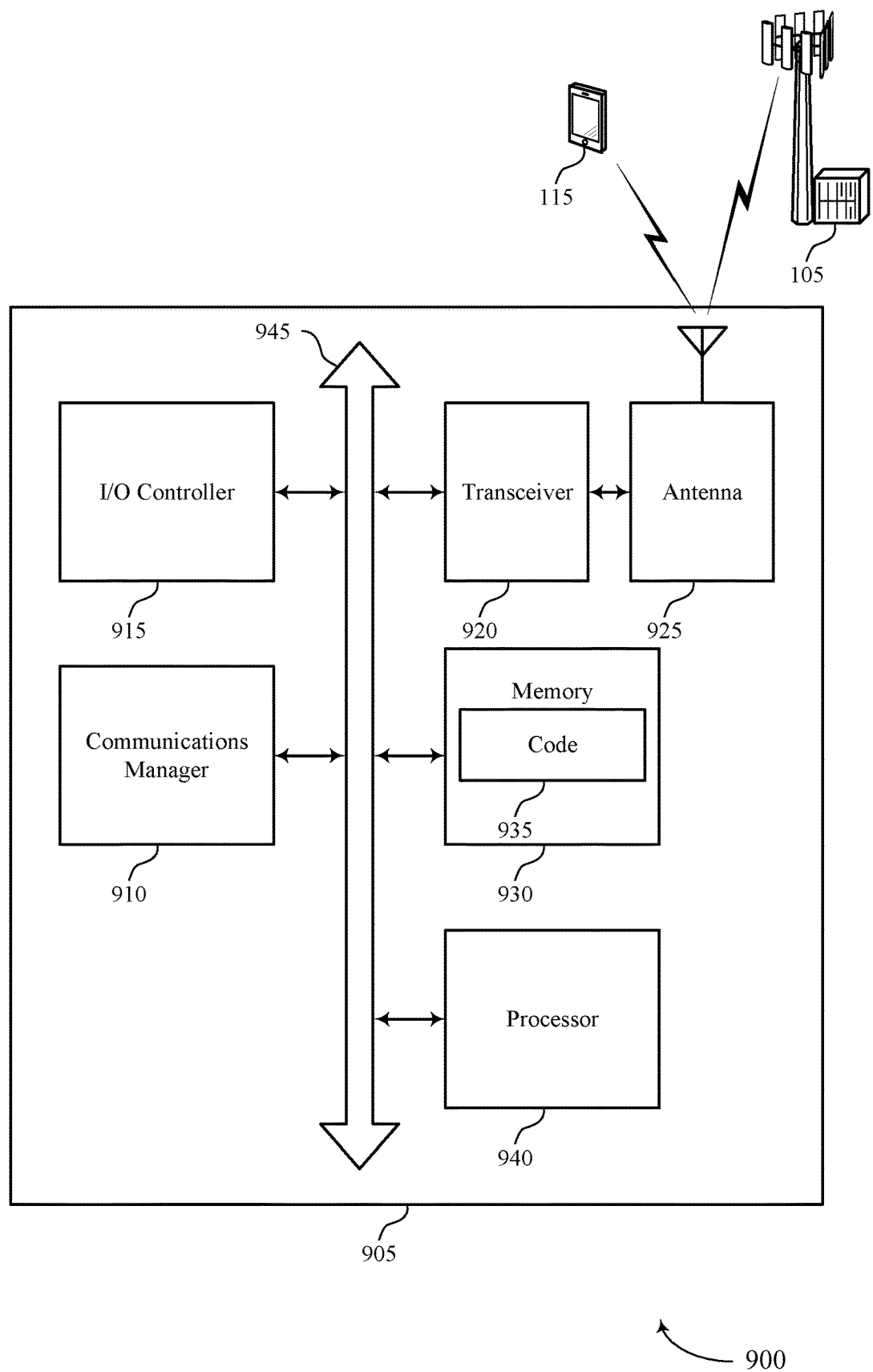
FIG. 9 shows a diagram of a system including a device that supports handling DAIs for different types of DCI in accordance with aspects of the present disclosure.

FIG. 9 shows a diagram of a system 900 including a device 905 that supports handling DAIs for different types of DCI in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a first DCI message for a first downlink data transmission and a second DCI message for a second downlink data transmission, the first DCI message including a first number of bits for a first cDAI and the second DCI message including a second number of bits for a second cDAI, determine whether the first number of bits for the first cDAI is different from the second number of bits for the second cDAI, and transmit a feedback message for at least the first downlink data transmission and the second downlink data transmission, the feedback message based on the determining.

The communications manager 910, or its sub-components, may be implemented in hardware, code (e.g., software or firmware) executed by a processor, or any combination thereof. If implemented in code executed by a processor, the functions of the communications manager 910, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 910, or its sub-components, may be physically located at various positions, including being distributed such that portions of functions are implemented at different physical locations by one or more physical components. In some examples, the communications manager 910, or its sub-components, may be a separate and distinct component in accordance with various aspects of the present disclosure. In some examples, the communications manager 910, or its sub-components, may be combined with one or more other hardware components, including but not limited to an I/O component, a transceiver, a network server, another computing device, one or more other components described in the present disclosure, or a combination thereof in accordance with various aspects of the present disclosure.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may include, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting handling DAIs for different types of DCI).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
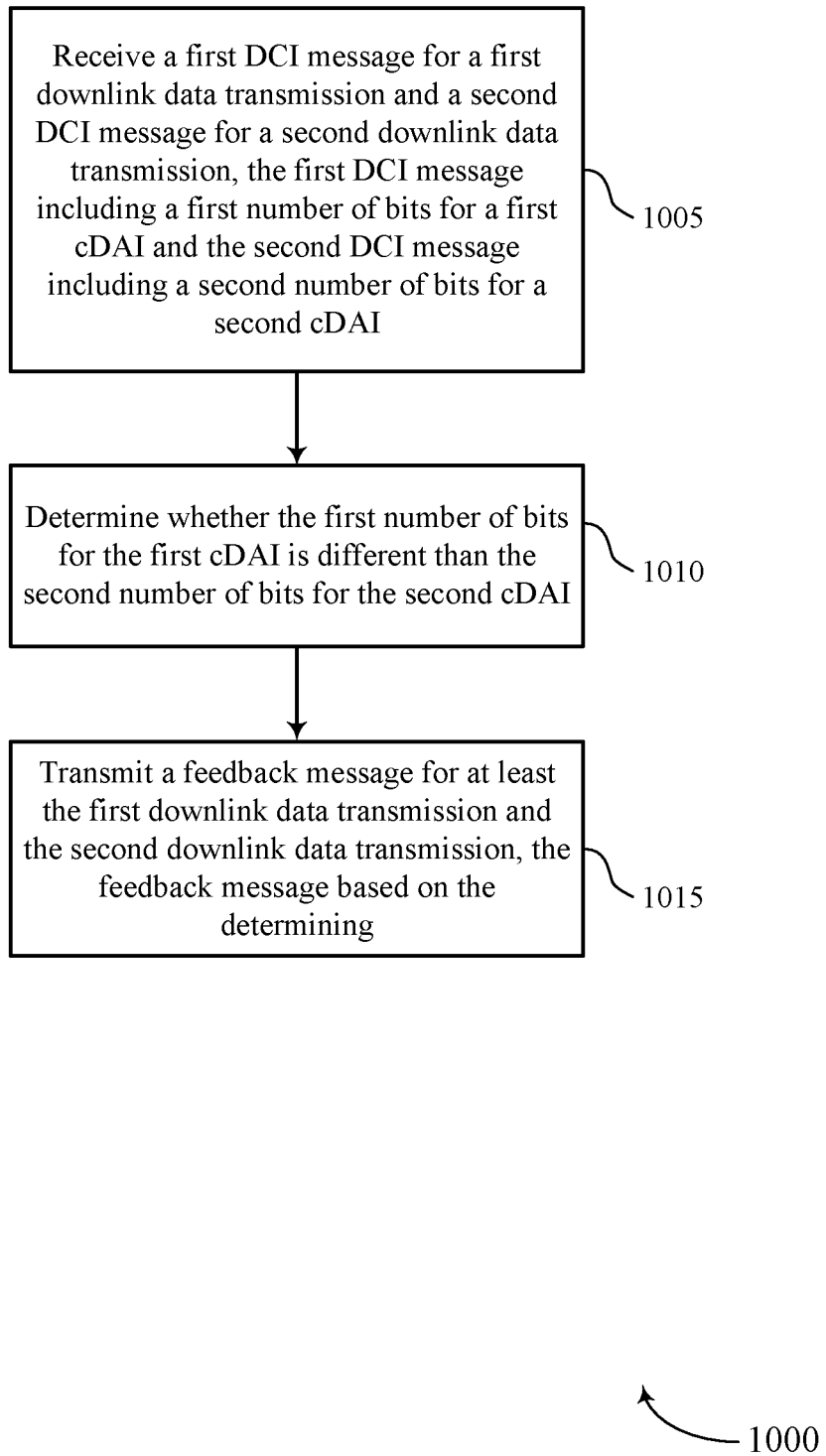
FIGS. 10 through 12 show flowcharts illustrating methods that support handling DAIs for different types of DCI in accordance with aspects of the present disclosure.

FIG. 10 shows a flowchart illustrating a method 1000 that supports handling DAIs for different types of DCI in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may receive a first DCI message for a first downlink data transmission and a second DCI message for a second downlink data transmission, the first DCI message including a first number of bits for a first cDAI and the second DCI message including a second number of bits for a second cDAI. The operations of 1005 may be performed according to the methods described herein. In some examples, aspects of the operations of 1005 may be performed by a DCI reception component as described with reference to FIGS. 6 through 9.

At 1010, the UE may determine whether the first number of bits for the first cDAI is different from (i.e., different from) the second number of bits for the second cDAI. The operations of 1010 may be performed according to the methods described herein. In some examples, aspects of the operations of 1010 may be performed by a bit comparison component as described with reference to FIGS. 6 through 9.

At 1015, the UE may transmit a feedback message for at least the first downlink data transmission and the second downlink data transmission, the feedback message based on the determining. The operations of 1015 may be performed according to the methods described herein. In some examples, aspects of the operations of 1015 may be performed by a request transmission component as described with reference to FIGS. 6 through 9.

Figure 11:
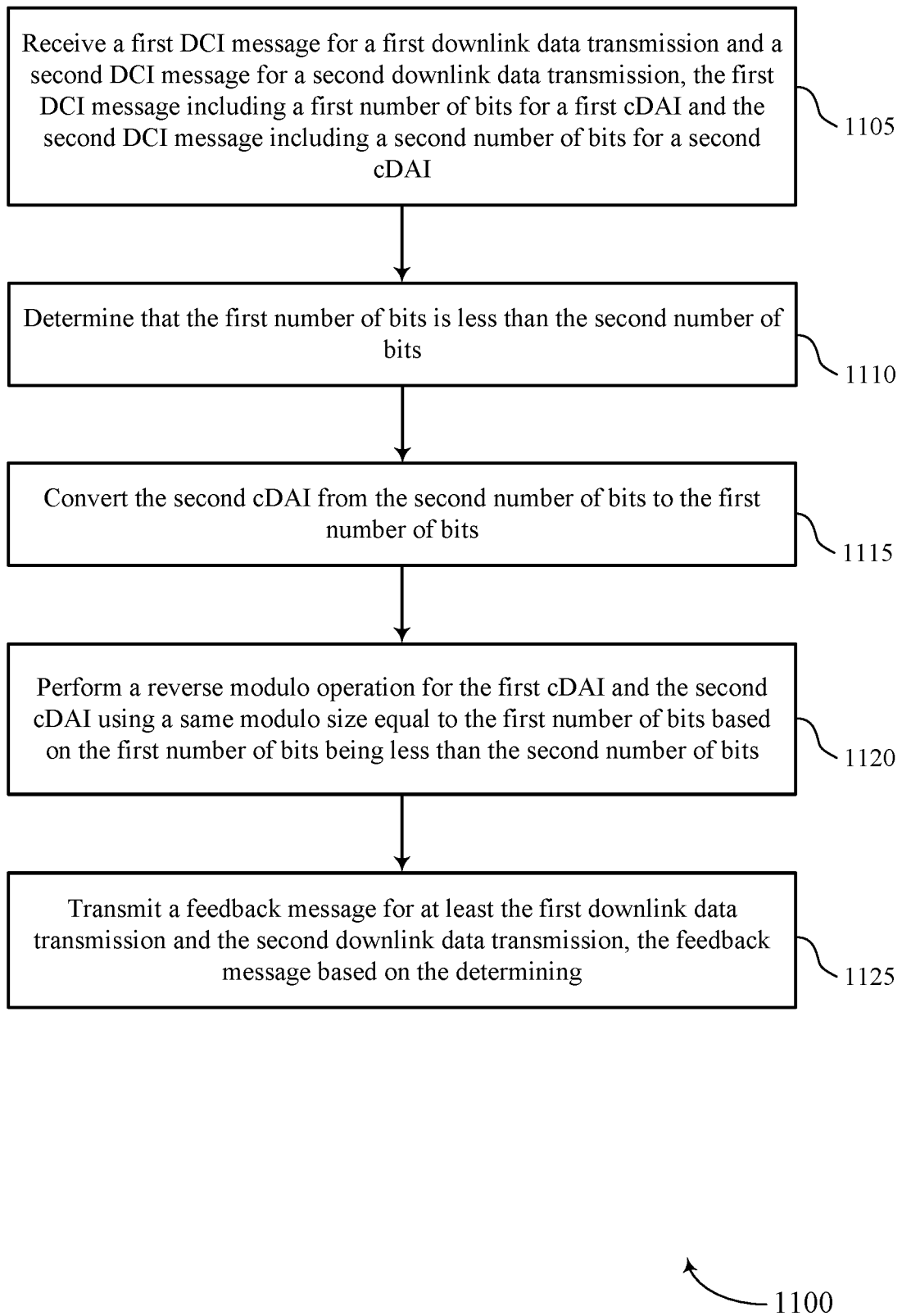

FIG. 11 shows a flowchart illustrating a method 1100 that supports handling DAIs for different types of DCI in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may receive a first DCI message for a first downlink data transmission and a second DCI message for a second downlink data transmission, the first DCI message including a first number of bits for a first cDAI and the second DCI message including a second number of bits for a second cDAI. The operations of 1105 may be performed according to the methods described herein. In some examples, aspects of the operations of 1105 may be performed by a DCI reception component as described with reference to FIGS. 6 through 9.

At 1110, the UE may determine whether the first number of bits for the first cDAI is different from the second number of bits for the second cDAI. For example, the UE may determine that the first number of bits is less than the second number of bits. The operations of 1110 may be performed according to the methods described herein. In some examples, aspects of the operations of 1110 may be performed by a bit comparison component as described with reference to FIGS. 6 through 9.

At 1115, the UE may convert the second cDAI from the second number of bits to the first number of bits. The operations of 1115 may be performed according to the methods described herein. In some examples, aspects of the operations of 1115 may be performed by an indicator conversion component as described with reference to FIGS. 6 through 9.

At 1120, the UE may perform a reverse modulo operation for the first cDAI and the second cDAI using a same modulo size equal to the first number of bits based on the first number of bits being less than the second number of bits. The operations of 1120 may be performed according to the methods described herein. In some examples, aspects of the operations of 1120 may be performed by a reverse modulo component as described with reference to FIGS. 6 through 9.

At 1125, the UE may transmit a feedback message for at least the first downlink data transmission and the second downlink data transmission, the feedback message based on the determining. The operations of 1125 may be performed according to the methods described herein. In some examples, aspects of the operations of 1125 may be performed by a request transmission component as described with reference to FIGS. 6 through 9.

Figure 12:
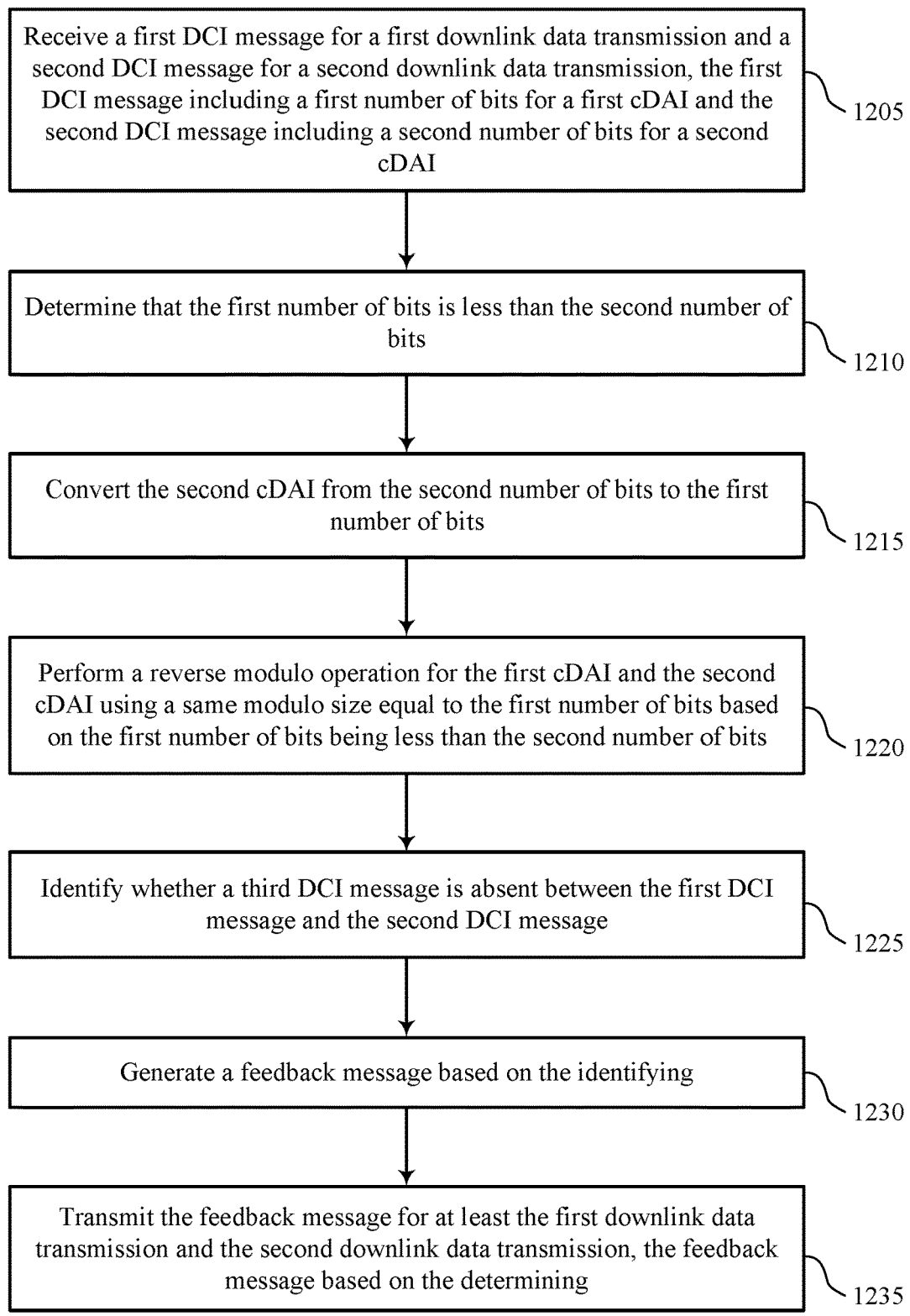

FIG. 12 shows a flowchart illustrating a method 1200 that supports handling DAIs for different types of DCI in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may receive a first DCI message for a first downlink data transmission and a second DCI message for a second downlink data transmission, the first DCI message including a first number of bits for a first cDAI and the second DCI message including a second number of bits for a second cDAI. The operations of 1205 may be performed according to the methods described herein. In some examples, aspects of the operations of 1205 may be performed by a DCI reception component as described with reference to FIGS. 6 through 9.

At 1210, the UE may determine whether the first number of bits for the first cDAI is different from the second number of bits for the second cDAI. For example, the UE may determine that the first number of bits is less than the second number of bits. The operations of 1210 may be performed according to the methods described herein. In some examples, aspects of the operations of 1210 may be performed by a bit comparison component as described with reference to FIGS. 6 through 9.

At 1215, the UE may convert the second cDAI from the second number of bits to the first number of bits. The operations of 1215 may be performed according to the methods described herein. In some examples, aspects of the operations of 1215 may be performed by an indicator conversion component as described with reference to FIGS. 6 through 9.

At 1220, the UE may perform a reverse modulo operation for the first cDAI and the second cDAI using a same modulo size equal to the first number of bits based on the first number of bits being less than the second number of bits. The operations of 1220 may be performed according to the methods described herein. In some examples, aspects of the operations of 1220 may be performed by a reverse modulo component as described with reference to FIGS. 6 through 9.

At 1225, the UE may identify whether a third DCI message is absent between the first DCI message and the second DCI message (e.g., based on performing the reverse modulo operation or based on comparing consecutive pairs of cDAI bit values of an ordered list). The operations of 1225 may be performed according to the methods described herein. In some examples, aspects of the operations of 1225 may be performed by a DCI identification component as described with reference to FIGS. 6 through 9.

At 1230, the UE may generate a feedback message based on the identifying. The operations of 1230 may be performed according to the methods described herein. In some examples, aspects of the operations of 1230 may be performed by a request transmission component as described with reference to FIGS. 6 through 9.

At 1235, the UE may transmit the feedback message for at least the first downlink data transmission and the second downlink data transmission, the feedback message based on the determining. The operations of 1235 may be performed according to the methods described herein. In some examples, aspects of the operations of 1235 may be performed by a request transmission component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
    receiving a first downlink control information message for a first downlink data transmission and a second downlink control information message for a second downlink data transmission, the first downlink control information message comprising a first number of bits for a first counter downlink assignment indicator and the second downlink control information message comprising a second number of bits for a second counter downlink assignment indicator;

determining whether the first number of bits for the first counter downlink assignment indicator is less than the second number of bits for the second counter downlink assignment indicator;

converting the second counter downlink assignment indicator from the second number of bits to the first number of bits;

performing a reverse modulo operation for the first counter downlink assignment indicator and the second counter downlink assignment indicator using a same modulo size equal to the first number of bits based at least in part on the first number of bits being less than the second number of bits; and transmitting a feedback message for at least the first downlink data transmission and the second downlink data transmission, the feedback message based at least in part on the determining.

2. The method of claim 1, wherein the feedback message is for a plurality of downlink data transmissions comprising at least the first downlink data transmission and the second downlink data transmission, the determining comprising:

determining that the first number of bits is a minimum number of bits for a plurality of counter downlink assignment indicators of a plurality of downlink control information messages for the plurality of downlink data transmissions.

3. The method of claim 2, wherein:

the converting comprises converting the plurality of counter downlink assignment indicators to the first number of bits based at least in part on the first number of bits being the minimum number of bits for the plurality of counter downlink assignment indicators; and the performing the reverse modulo operation comprises performing the reverse modulo operation for the plurality of counter downlink assignment indicators using the same modulo size equal to the first number of bits based at least in part on the first number of bits being the minimum number of bits for the plurality of counter downlink assignment indicators.

4. The method of claim 1, wherein the feedback message is for a plurality of downlink data transmissions comprising at least the first downlink data transmission and the second downlink data transmission, the method further comprising:

ordering a plurality of downlink control information messages for the plurality of downlink data transmissions, wherein the determining is based at least in part on the first downlink control information message and the second downlink control information message being consecutive based at least in part on the ordering.

5. The method of claim 4, wherein the ordering comprises:

ordering the plurality of downlink control information messages by component carriers, by monitoring occasions, or by a combination thereof.

6. The method of claim 4, wherein the determining comprises:

determining whether counter downlink assignment indicators comprise different numbers of bits for each consecutive pair of downlink control information messages based at least in part on the ordering.

7. The method of claim 6, further comprising:

identifying that one or more downlink control information messages are absent between downlink control information messages of a consecutive pair of downlink control information messages based at least in part on a minimum number of bits for a counter downlink assignment indicator of the consecutive pair of downlink control information messages; and inserting placeholder counter downlink assignment indicators into an ordered list of counter downlink assignment indicators for each of the identified one or more downlink control messages that are absent, wherein the ordered list comprises a plurality of counter downlink assignment indicators of the plurality of downlink control information messages ordered based at least in part on the ordered plurality of downlink control information messages.

8. The method of claim 7, wherein:

the converting comprises converting the plurality of counter downlink assignment indicators and the placeholder counter downlink assignment indicators of the ordered list to the first number of bits based at least in part on the first number of bits being a minimum number of bits for the plurality of counter downlink assignment indicators; and the performing the reverse modulo operation comprises performing the reverse modulo operation for the plurality of counter downlink assignment indicators and the placeholder counter downlink assignment indicators of the ordered list using the same modulo size equal to the first number of bits based at least in part on the first number of bits being the minimum number of bits for the plurality of counter downlink assignment indicators.

9. The method of claim 1, wherein converting the second counter downlink assignment indicator from the second number of bits to the first number of bits comprises:

removing a number of most significant bits from the second counter downlink assignment indicator corresponding to a difference between the second number of bits and the first number of bits.

10. The method of claim 1, further comprising:

identifying whether a third downlink control information message is absent between the first downlink control information message and the second downlink control information message based at least in part on performing the reverse modulo operation; and generating the feedback message based at least in part on the identifying.

11. The method of claim 10, wherein the identifying comprises identifying that the third downlink control information message is absent, the method further comprising:

inputting a negative acknowledgment indicator for the third downlink control information message into a codebook, wherein the feedback message is generated based at least in part on the codebook.

12. The method of claim 1, wherein the first downlink control information message and the second downlink control information message correspond to different downlink control information types, different component carriers, different monitoring occasions, different search space sets, different control resource sets, different dynamic configurations, or a combination thereof.

13. The method of claim 1, wherein the determining comprises determining that the first number of bits is equal to the second number of bits, the method further comprising:

performing a reverse modulo operation for the first counter downlink assignment indicator and the second counter downlink assignment indicator using a same modulo size equal to the first number of bits and the second number of bits.

14. The method of claim 13, wherein the feedback message is for a plurality of downlink data transmissions comprising at least the first downlink data transmission and the second downlink data transmission, the determining comprising:
determining that each downlink control information message for the plurality of downlink data transmissions comprises a number of bits for a counter downlink assignment indicator equal to the first number of bits and the second number of bits.

15. The method of claim 14, wherein the performing the reverse modulo operation comprises:
performing the reverse modulo operation for a plurality of counter downlink assignment indicators of a plurality of downlink control information messages for the plurality of downlink data transmissions using the same modulo size equal to the first number of bits and the second number of bits based at least in part on each downlink control information message comprising the number of bits for the counter downlink assignment indicator equal to the first number of bits and the second number of bits.

16. The method of claim 13, further comprising:
identifying whether a third downlink control information message is absent between the first downlink control information message and the second downlink control information message based at least in part on performing the reverse modulo operation; and
generating the feedback message based at least in part on the identifying.

17. The method of claim 16, wherein the identifying comprises identifying that the third downlink control information message is absent, the method further comprising:
inputting a negative acknowledgment indicator for the third downlink control information message into a codebook, wherein the feedback message is generated based at least in part on the codebook.

18. The method of claim 1, wherein the first downlink control information message comprises a third number of bits for a first total downlink assignment indicator and the second downlink control information message comprises a fourth number of bits for a second total downlink assignment indicator, the method further comprising:
determining whether the third number of bits for the first total downlink assignment indicator is different from the fourth number of bits for the second total downlink assignment indicator, wherein the feedback message is based at least in part on the determining whether the third number of bits is different from the fourth number of bits.

19. The method of claim 18, wherein the determining whether the third number of bits is different from the fourth number of bits comprises determining that the third number of bits is less than the fourth number of bits, the method further comprising:
converting the first total downlink assignment indicator to the second total downlink assignment indicator and from the third number of bits to the fourth number of bits.

20. The method of claim 19, wherein:
the feedback message is for a plurality of downlink data transmissions comprising at least the first downlink data transmission and the second downlink data transmission;
the determining whether the third number of bits is different from the fourth number of bits comprises determining that the fourth number of bits is a maximum number of bits for a plurality of total downlink assignment indicators of a plurality of downlink control information messages received in a same monitoring occasion for the plurality of downlink data transmissions; and
the converting comprises converting the plurality of total downlink assignment indicators to the second total downlink assignment indicator and to the fourth number of bits based at least in part on the fourth number of bits being the maximum number of bits for the plurality of total downlink assignment indicators.

21. The method of claim 19, further comprising:
comparing a number of downlink control information messages for the feedback message received in a same monitoring occasion to the second total downlink assignment indicator; and
identifying whether a third downlink control information message is absent from the same monitoring occasion based at least in part on the comparing.

22. The method of claim 18, wherein the determining whether the third number of bits is different from the fourth number of bits comprises determining that the third number of bits is less than the fourth number of bits, the method further comprising:
converting the second total downlink assignment indicator to the first total downlink assignment indicator and from the fourth number of bits to the third number of bits.

23. The method of claim 22, wherein:
the feedback message is for a plurality of downlink data transmissions comprising at least the first downlink data transmission and the second downlink data transmission;
the determining whether the third number of bits is different from the fourth number of bits comprises determining that the third number of bits is a minimum number of bits for a plurality of total downlink assignment indicators of a plurality of downlink control information messages received in a same monitoring occasion for the plurality of downlink data transmissions; and
the converting comprises converting the plurality of total downlink assignment indicators to the first total downlink assignment indicator and to the third number of bits based at least in part on the third number of bits being the minimum number of bits for the plurality of total downlink assignment indicators.

24. The method of claim 18, further comprising:
verifying that one or more least significant bits of the third number of bits and the fourth number of bits are the same, wherein the feedback message is based at least in part on the verifying.

25. The method of claim 18, wherein:
the first number of bits is equal to the third number of bits; and
the second number of bits is equal to the fourth number of bits.

26. The method of claim 1, wherein the feedback message comprises a hybrid automatic repeat request acknowledgment message.

27. An apparatus for wireless communications, comprising:
a processor;
memory coupled with the processor; and
instructions stored in the memory and executable by the processor to cause the apparatus to:
receive a first downlink control information message for a first downlink data transmission and a second downlink control information message for a second downlink data transmission, the first downlink control information message comprising a first number of bits for a first counter downlink assignment indicator and the second downlink control information message comprising a second number of bits for a second counter downlink assignment indicator;
determine whether the first number of bits for the first counter downlink assignment indicator is less than the second number of bits for the second counter downlink assignment indicator;
convert the second counter downlink assignment indicator from the second number of bits to the first number of bits;
perform a reverse modulo operation for the first counter downlink assignment indicator and the second counter downlink assignment indicator using a same modulo size equal to the first number of bits based at least in part on the first number of bits being less than the second number of bits; and
transmit a feedback message for at least the first downlink data transmission and the second downlink data transmission, the feedback message based at least in part on the determining.

28. The apparatus of claim 27, wherein the feedback message is for a plurality of downlink data transmissions comprising at least the first downlink data transmission and the second downlink data transmission, wherein the instructions further comprise instructions to cause the apparatus to:
determine that the first number of bits is a minimum number of bits for a plurality of counter downlink assignment indicators of a plurality of downlink control information messages for the plurality of downlink data transmissions.

29. The apparatus of claim 28, wherein:
the instructions to convert comprise instructions to cause the apparatus to convert the plurality of counter downlink assignment indicators to the first number of bits based at least in part on the first number of bits being the minimum number of bits for the plurality of counter downlink assignment indicators; and
the instructions to perform the reverse modulo operation comprise instructions to cause the apparatus to perform the reverse modulo operation for the plurality of counter downlink assignment indicators using the same modulo size equal to the first number of bits based at least in part on the first number of bits being the minimum number of bits for the plurality of counter downlink assignment indicators.

30. The apparatus of claim 27, wherein the feedback message is for a plurality of downlink data transmissions comprising at least the first downlink data transmission and the second downlink data transmission, wherein the instructions are further to cause the apparatus to:
order a plurality of downlink control information messages for the plurality of downlink data transmissions, wherein the instructions to determine comprise instructions to cause the apparatus to determine based at least in part on the first downlink control information message and the second downlink control information message being consecutive based at least in part on the ordering.

31. The apparatus of claim 30, wherein the instructions to order comprise instructions to cause the apparatus to order the plurality of downlink control information messages by component carriers, by monitoring occasions, or by a combination thereof.

32. The apparatus of claim 31, wherein the instructions to determine comprise instructions to cause the apparatus to determine whether counter downlink assignment indicators comprise different numbers of bits for each consecutive pair of downlink control information messages based at least in part on the ordering.

33. The apparatus of claim 27, wherein the instructions to convert the second counter downlink assignment indicator from the second number of bits to the first number of bits comprise instructions that cause the apparatus to remove a number of most significant bits from the second counter downlink assignment indicator corresponding to a difference between the second number of bits and the first number of bits.

34. The apparatus of claim 27, wherein the instructions are further to cause the apparatus to:
identify whether a third downlink control information message is absent between the first downlink control information message and the second downlink control information message based at least in part on performing the reverse modulo operation; and
generate the feedback message based at least in part on the identifying.

35. The apparatus of claim 27, wherein the first downlink control information message and the second downlink control information message correspond to different downlink control information types, different component carriers, different monitoring occasions, different search space sets, different control resource sets, different dynamic configurations, or a combination thereof.

36. The apparatus of claim 27, wherein the instructions to determine are further to cause the apparatus to determine that the first number of bits is equal to the second number of bits, and wherein the instructions are further to cause the apparatus to:
perform a reverse modulo operation for the first counter downlink assignment indicator and the second counter downlink assignment indicator using a same modulo size equal to the first number of bits and the second number of bits.

37. An apparatus for wireless communications, comprising:
means for receiving a first downlink control information message for a first downlink data transmission and a second downlink control information message for a second downlink data transmission, the first downlink control information message comprising a first number of bits for a first counter downlink assignment indicator and the second downlink control information message comprising a second number of bits for a second counter downlink assignment indicator;
means for determining whether the first number of bits for the first counter downlink assignment indicator is less than the second number of bits for the second counter downlink assignment indicator;
means for converting the second counter downlink assignment indicator from the second number of bits to the first number of bits;

means for performing a reverse modulo operation for the first counter downlink assignment indicator and the second counter downlink assignment indicator using a same modulo size equal to the first number of bits based at least in part on the first number of bits being less than the second number of bits; and means for transmitting a feedback message for at least the first downlink data transmission and the second downlink data transmission, the feedback message based at least in part on the determining.

38. A non-transitory computer-readable medium storing code for wireless communications, the code comprising instructions executable by a processor to:

receive a first downlink control information message for a first downlink data transmission and a second downlink control information message for a second downlink data transmission, the first downlink control information message comprising a first number of bits for a first counter downlink assignment indicator and the second downlink control information message comprising a second number of bits for a second counter downlink assignment indicator;

determine whether the first number of bits for the first counter downlink assignment indicator is different from the second number of bits for the second counter downlink assignment indicator;

convert the second counter downlink assignment indicator from the second number of bits to the first number of bits;

perform a reverse modulo operation for the first counter downlink assignment indicator and the second counter downlink assignment indicator using a same modulo size equal to the first number of bits based at least in part on the first number of bits being less than the second number of bits; and transmit a feedback message for at least the first downlink data transmission and the second downlink data transmission, the feedback message based at least in part on the determining.

* * * * *